(12) United States Patent
Nagahara

(10) Patent No.: US 8,390,935 B2
(45) Date of Patent: Mar. 5, 2013

(54) PROJECTION ZOOM LENS AND PROJECTION DISPLAY DEVICE

(75) Inventor: Akiko Nagahara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 393 days.

(21) Appl. No.: 12/833,445

(22) Filed: Jul. 9, 2010

(65) Prior Publication Data
US 2011/0013151 A1    Jan. 20, 2011

(30) Foreign Application Priority Data

Jul. 14, 2009 (JP) ............................... P2009-165976

(51) Int. Cl.
*G02B 15/14* (2006.01)
(52) U.S. Cl. ....................................... 359/680; 359/683
(58) Field of Classification Search .................. 359/680, 359/681, 682, 683
See application file for complete search history.

(56) References Cited

U.S. PATENT DOCUMENTS

| 2009/0135496 A1 | 5/2009 | Nagahara et al. |
| 2009/0135497 A1 | 5/2009 | Nagahara et al. |
| 2009/0219624 A1* | 9/2009 | Yamamoto et al. ........... 359/684 |
| 2010/0165477 A1* | 7/2010 | Nagahara ...................... 359/682 |
| 2010/0271601 A1* | 10/2010 | Amano ............................ 353/97 |

FOREIGN PATENT DOCUMENTS

| JP | 8-201690 A | 8/1996 |
| JP | 2002-122782 A | 4/2002 |
| JP | 2007-241184 A | 9/2007 |
| JP | 2009-128683 A | 6/2009 |
| JP | 2009-128684 A | 6/2009 |

\* cited by examiner

*Primary Examiner* — Scott J Sugarman
(74) *Attorney, Agent, or Firm* — Birch, Stewart, Kolasch & Birch, LLP

(57) ABSTRACT

A projection zoom lens includes: a first lens group that has a negative refractive power, is fixed when power varies, and has a focusing function; a second positive lens group; a third positive lens group; a fourth negative lens group; a fifth positive lens group; and a sixth lens group that has a positive refractive power, is fixed when power varies, and includes an aperture diaphragm arranged closest to a magnification side. The first to sixth lens groups are arranged in this order from the magnification side, and the second to fifth lens groups are moved when power varies. All lenses are single lenses. The ratio of the back focal length Bf of the entire system to the focal length f of the entire system at a wide angle end is more than 2.5. The Fno. is constant in the entire power variation range.

15 Claims, 17 Drawing Sheets

EXAMPLE 1 (WIDE)

EXAMPLE 1 (WIDE)

EXAMPLE 2(WIDE)

EXAMPLE 3 (WIDE)

EXAMPLE 4 (WIDE)

EXAMPLE 5 (WIDE)

EXAMPLE 1

FIG. 15
EXAMPLE 4
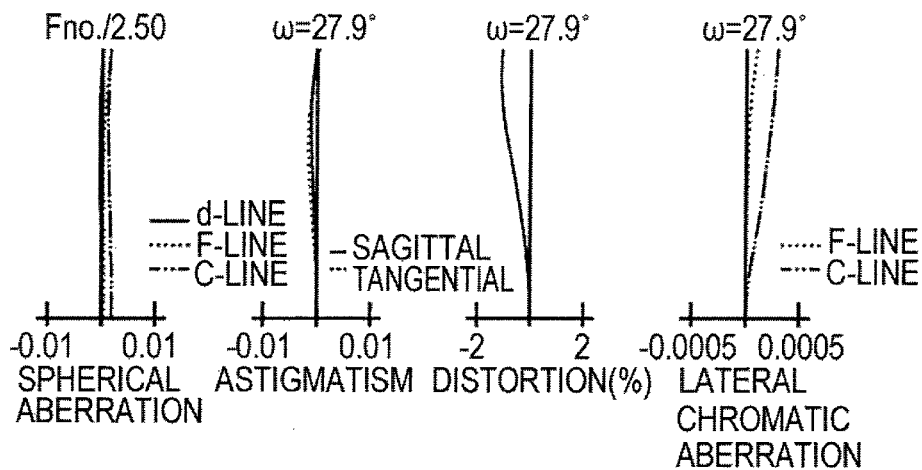
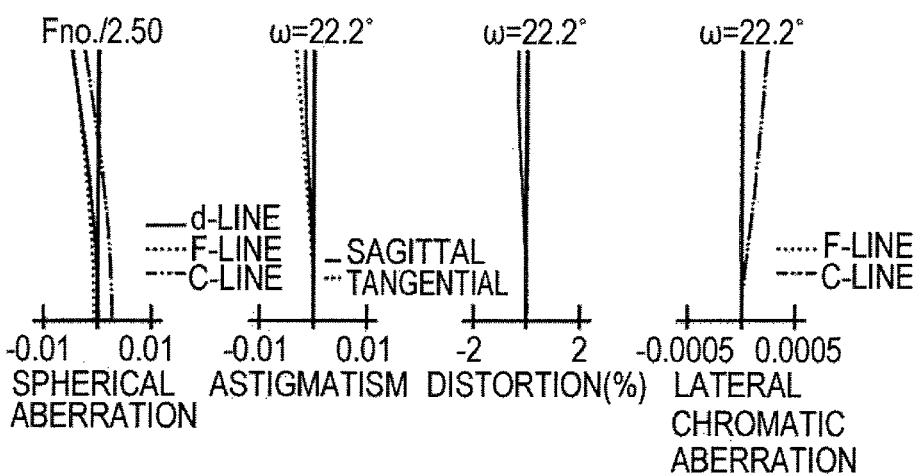
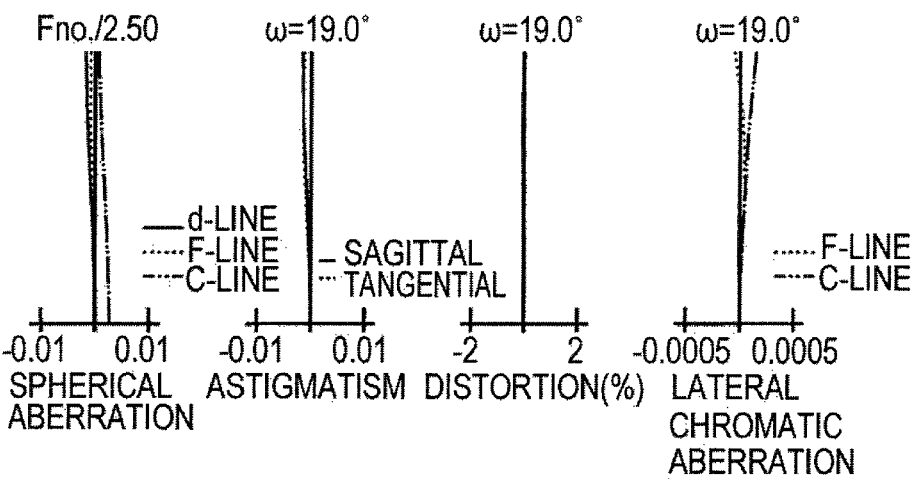

FIG. 16
EXAMPLE 5
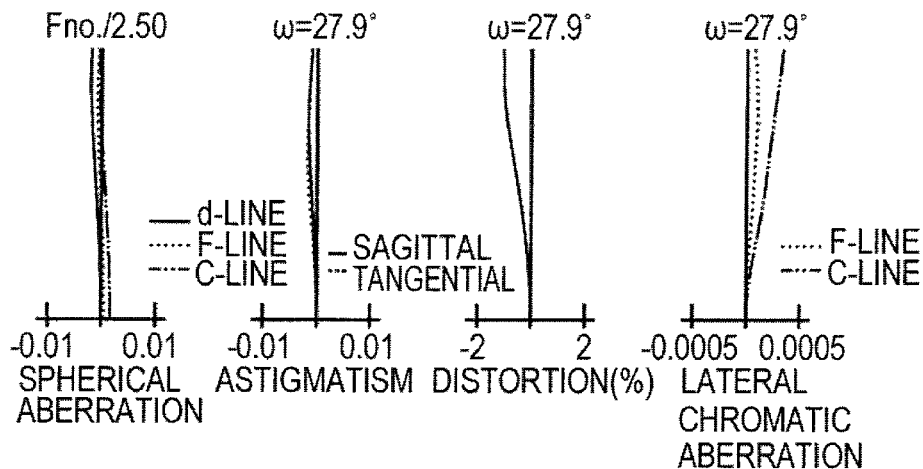
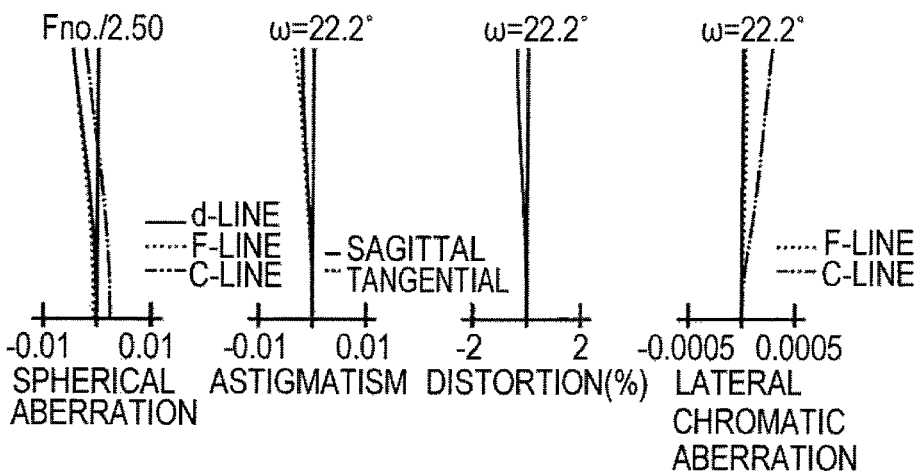
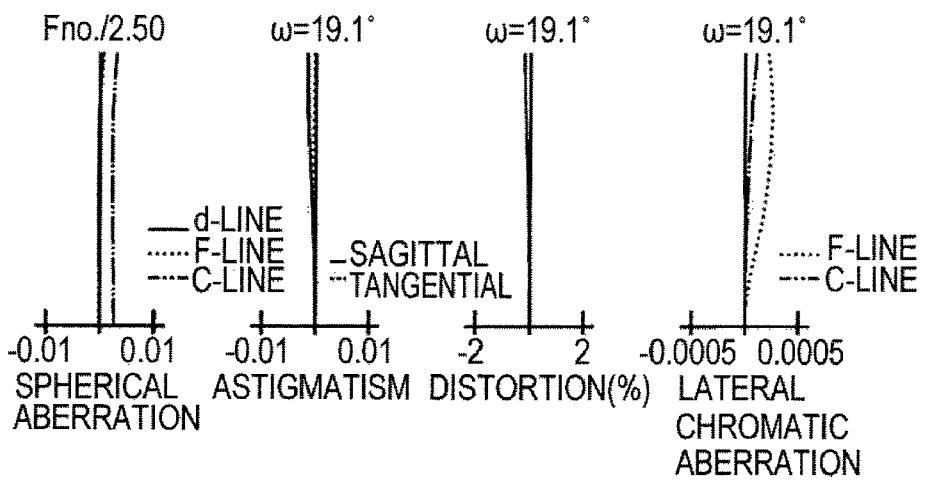

PROJECTION ZOOM LENS AND PROJECTION DISPLAY DEVICE

CROSS-REFERENCE TO RELATED APPLICATIONS

This application is based upon and claims the benefit of priority from the Japanese Patent Application No. 2009-165976 filed on 14 Jul. 2009; the entire contents of which are incorporated herein by reference.

BACKGROUND OF THE INVENTION

1. Field of the Invention

The present invention relates to a projection zoom lens which is provided in, for example, a projection display device and includes six lens groups, four of which are moved, and a projection display device including the projection zoom lens, and more particularly, to a projection zoom lens and a projection display device that are suitable to project an image onto a large screen in, for example, a movie theater.

2. Description of the Related Art

In recent years, projectors (projection display devices) that use light valves, such as liquid crystal display devices or DMD display devices, and have a relatively large back focal length have come into widespread use (see JP-A-8-201690).

In recent years, projectors that can be applied to a large screen and project a high-definition image have been used in, for example, the movie theater.

The cinema projector is a three-panel type including three reflective liquid crystal display devices or three DMDs and requires a large back focal length and high telecentricity.

In general, a value obtained by dividing the projection distance by the width of the screen is called a throw ratio. The screen size and the distance (projection distance) from the screen to a projection room depend on the movie theaters. Therefore, a lens corresponding to the throw ratio of each movie theater is needed to project an image with a size suitable for each movie theater. It is inefficient to prepare the individual lenses corresponding to various throw ratios in terms of costs. In order to solve the above-mentioned problems, a zoom lens can be used to respond to a wide throw ratio range.

However, in many lenses for a projector according to the related art, the numerical aperture thereof is changed during zoom (hereinafter, in some cases, 'Fno.' is used instead of the numerical aperture). In general, the Fno. at the telephoto end is larger than that at the wide angle end. Therefore, in the zoom lens, even when the screen sizes of the movie theaters are equal to each other, the image projected onto the screen of the movie theater with a high throw ratio is darker than that projected onto the screen of the movie theater with a low throw ratio.

As the zoom ratio of the lens increases, the compatibility of the lens increases. However, in the lens for a projector according to the related art, as the zoom ratio increases, a variation in Fno. tends to increase. Therefore, the lens is not suitable for the movie theater.

JP-A-2002-122782 discloses a zoom lens capable of solving the problems that the Fno. is changed with the variation in the zoom ratio and the lens for a projector is not suitable for the movie theater. However, since the lens disclosed in JP-A-2002-122782 is a varifocal lens, telecentricity is not maintained to be constant when power varies, or after the lens is provided, the adjustment of an operation is complicated when power needs to vary.

JP-A-2007-241184 discloses a zoom lens in which the zoom ratio increases while Fno. is maintained to be constant during zoom. The zoom lens disclosed in JP-A-2007-241184 has a small back focal length that is not suitable for a cinema zoom lens and uses a cemented lens. Therefore, when the zoom lens is provided in a projection projector apparatus using a light source, such as a xenon lamp that emits light with very high intensity, an adhesive for bonding lenses is significantly altered and deteriorated by the high-intensity light, which causes a reduction in the performance of the lens.

In order to solve the above-mentioned problems, the inventors have proposed a telecentric projection zoom lens which has an appropriate back focal length, a constant Fno. during zoom, a high zoom ratio, and high compatibility, and does not use a cemented lens (see Japanese Patent Application Nos. 2007-304317 and 2007-304318).

The projection zoom lens disclosed in Japanese Patent Application. No. 2007-304317 (hereinafter, referred to as 'Proposed invention 4') includes five lens groups. Among the five lens groups, three lens groups are moved, and an aperture diaphragm that is fixed when power varies is provided between the fourth lens group and the fifth lens group.

The projection zoom lens disclosed in Japanese Patent Application No. 2007-304318 (hereinafter, referred to as 'Proposed invention 5') includes six lens groups. Among the six lens groups, four lens groups are moved, and an aperture diaphragm that is independently moved when power varies is provided between the fourth lens group and the fifth lens group.

The zoom lens according to Proposed invention 5 has an advantage in that it can obtain an angle of view wider than that according to Proposed invention 4. However, the moving group is arranged close to the reduction side. Therefore, when the outside diameters of the lenses including mechanisms are compared with each other, the outside diameter of the lens arranged on the reduction side in the zoom lens according to Proposed invention 5 is more than that in the zoom lens according to Proposed invention 4.

In general, a coupling mechanism for coupling the projection display device and the lens is provided in an outer circumferential portion of the lens. However, when the lens is coupled to the existing cinema projection display device, the coupling mechanism is generally provided closer to the reduction side than the position of the aperture diaphragm (in the zoom lens according to Proposed invention 5, the position of the aperture diaphragm position at the wide angle end).

In the existing projection display device, the size of a space for arranging the projection lens has already been determined. Therefore, in order to provide a newly proposed projection lens in the existing device, at least the lens arranged closer to the reduction side than the position of the coupling mechanism needs to have a sufficient outside diameter to be accommodated in the space for arranging the lens in the device.

However, the outside diameter of the lens arranged closer to the reduction side than the position of the coupling mechanism in the zoom lens according to Proposed invention 5 is more than that in the zoom lens according to Proposed invention 4. Therefore, it is difficult to attach the zoom lens according to Proposed invention 4 to the existing projection display device that can be attached. In the zoom lens disclosed in JP-A-2007-241184, since the moving group is arranged closer to the reduction side than the position of the aperture diaphragm, the outside diameter of the reduction-side lens increases.

SUMMARY OF THE INVENTION

The invention has been made in order to solve the above-mentioned problems, and an object of the invention is to provide a telecentric projection zoom lens which has an appropriate back focal length, a wide angle of view, a constant Fno. at a wide angle end during zoom, a high zoom ratio, and high compatibility and in which the outside diameter of a lens arranged closer to a reduction side than the position of a coupling mechanism can be reduced, and a projection display device using the same.

According to an aspect of the invention, a projection zoom lens includes: a first lens group that has a negative refractive power, is fixed when power varies, and has a focusing function; a second lens group that has a positive refractive power and is moved when power varies; a third lens group that has a positive refractive power and is moved when power varies; a fourth lens group that has a negative refractive power and is moved when power varies; a fifth lens group that has a positive refractive power and is moved when power varies; and a sixth lens group that has a positive refractive power, is fixed when power varies, and includes an aperture diaphragm arranged closest to a magnification side. The first to sixth lens groups are arranged in this order from the magnification side. A numerical aperture is constant in the entire power variation range. All lenses are single lenses. A reduction side is telecentric. The projection zoom lens satisfies the following Conditional expression 1:

$2.5 < Bf/f$         [Conditional expression 1]

(where Bf indicates the back focal length (air equivalent distance) of the entire system and f indicates the focal length of the entire system at a wide angle end).

The 'aperture diaphragm' includes a so-called aperture with a fixed diameter and a variable aperture diaphragm with a variable diameter.

In the projection zoom lens according to the above-mentioned aspect, the second lens group may include a positive meniscus lens that is arranged closest to the magnification side and has a concave surface facing the magnification side.

An aperture may be provided in the second lens group.

The projection zoom lens may satisfy the following Conditional expression 2:

$3.0 < f2/f < 7.4$         [Conditional expression 2]

(where f2 indicates the focal length of the second lens, group).

The fifth lens group may include one biconvex lens, and the fifth lens group may satisfy the following Conditional expression 3:

$70 < vd_{G5}$         [Conditional expression 3]

(where $vd_{G5}$ indicates the Abbe number of the biconvex lens in the fifth lens group with respect to the d-line).

The sixth lens group may include a negative meniscus lens having a convex surface facing the magnification side, a negative lens having a concave surface facing the magnification side, a positive lens having a convex surface facing the reduction side, and at least one positive lens which are arranged in this order from the magnification side. The sixth lens group may satisfy the following Conditional expression 4:

$60 < vd_{G6p}$         [Conditional expression 4]

(where $vd_{G6p}$ indicates the Abbe number of each positive lens in the sixth lens group with respect to the d-line).

The sixth lens group may satisfy the following Conditional expressions 5 and 6:

$40 < vd_{G6n}$; and         [Conditional expression 5]

$1.8 < Nd_{G6n}$         [Conditional expression 6]

(where $vd_{G6n}$ indicates the Abbe number of the negative lens having the concave surface facing the magnification side in the sixth lens group with respect to the d-line, and $Nd_{G6n}$ indicates the refractive index of the negative lens having the concave surface facing the magnification side in the sixth lens group with respect to the d-line).

The projection zoom lens may satisfy the following Conditional expression 7:

$-2.2 < f1/f < -1.0$         [Conditional expression 7]

(where f1 indicates the focal length of the first lens group).

The projection zoom lens may satisfy the following Conditional expression 8:

$3.1 < f3/f < 8.6$         [Conditional expression 8]

(where f3 indicates the focal length of the third lens group).

The projection zoom lens may satisfy the following Conditional expression 9:

$-7.8 < f4/f < -4.3$         [Conditional expression 9]

(where f4 indicates the focal length of the fourth lens group).

The projection zoom lens may satisfy the following Conditional expression 10:

$4.1 < f5/f < 7.8$         [Conditional expression 10]

(where f5 indicates the focal length of the fifth lens group).

The projection zoom lens may satisfy the following Conditional expression 11:

$2.4 < f6/f < 4.1$         [Conditional expression 11]

(where f6 indicates the focal length of the sixth lens group).

The projection zoom lens may satisfy the following Conditional expression 12:

$2.0 < D_{G6}/f < 3.5$         [Conditional expression 12]

(where $D_{G6}$ indicates the distance from the aperture diaphragm in the sixth lens group to a lens surface closest to the reduction side in the sixth lens group).

The projection zoom lens may satisfy the following Conditional expression 13:

$1.8 < |f6/f6_F| < 4.8$         [Conditional expression 13]

(where $f6_F$ indicates the distance from a lens surface closest to the magnification side in the sixth lens group to the focus of the sixth lens group on the magnification side and f6 indicates the focal length of the sixth lens group).

According to another aspect of the invention, a projection display device includes: a light source; a light valve; and the projection zoom lens according to the above-mentioned aspect that projects an optical image formed by light which is modulated by the light valve onto a screen.

The 'magnification side' means a side to be projected (screen side). In the case of reduced projection, the screen side is also referred to as the magnification side for convenience. The 'reduction side' means an original image display area side (light valve side). In the case of reduced projection, the light valve side is also referred to as the reduction side for convenience.

The projection zoom lens according to the above-mentioned aspect of the invention includes six lens groups, and four of the six lens groups are moved. Specifically, the projection zoom lens includes the first lens group that has a negative refractive power, is fixed when power varies, and has a focusing function; the second lens group that has a positive refractive power and is moved when power varies; the third lens group that has a positive refractive power and is moved when power varies; the fourth lens group that has a negative refractive power and is moved when power varies; the fifth lens group that has a positive refractive power and is moved when power varies; and the sixth lens group that has a positive refractive power, is fixed when power varies, and includes the aperture diaphragm arranged closest to the magnification side. The first to sixth lens groups are arranged in this order from the magnification side. All lenses are single lenses. The ratio of the back focal length Bf (air equivalent distance) of the entire system to the focal length f of the entire system at the wide angle end is more than 2.5. The Fno. is constant in the entire power variation range.

In this way, it is easy to widen the angle of view of the zoom lens while maintaining a high zoom ratio, and it is possible to maintain the Fno. to be substantially constant in the entire power variation range at a wide angle of view. In addition, since all lenses are single lenses, the zoom lens is suitable as a cinema projection zoom lens that transmits a large quantity of light and is used at a high temperature. Since the aperture diaphragm is arranged closest to the magnification side in the sixth lens group that is fixed when power varies and a moving group is arranged closer to the magnification side than the aperture diaphragm, it is possible to reduce the outside diameter of the lens arranged on the reduction side. Therefore, it is possible to attach the zoom lens to the existing projection display device in which the space for arranging the lens is limited.

Therefore, according to the projection zoom lens and the projection display device using the same according to the above-mentioned aspects of the invention, it is not necessary to provide dedicated projection lenses for each projection distance depending on the size of, for example, a movie theater, and it is possible to respond to various projection distances in a given range with one projection lens. In addition, it is possible to project an image with the same size with the same brightness onto the screen of any movie theater. Further, it is possible to project images with different aspect ratios while changing only the width of images and maintaining the height thereof using a zooming operation with a high zoom ratio.

Since the back focal length of the entire system is set as described above, it is possible to ensure a sufficient space to insert a glass block serving as a color composition unit, such as a cross dichroic prism or a TIR prism. In addition, it is possible to meet the demand for high telecentricity on the reduction side of the lens system.

BRIEF DESCRIPTION OF THE DRAWINGS

FIG. 15 is a diagram illustrating all aberrations of the projection zoom lens according to the Example 4;

FIG. 16 is a diagram illustrating all aberrations of the projection zoom lens according to the Example 5;

DESCRIPTION OF THE PREFERRED EMBODIMENTS

Hereinafter, exemplary embodiments of the invention will be described with reference to the accompanying drawings. An embodiment of the invention will be described below with reference to FIGS. 1 to 3 using a projection zoom lens according to Example 1 shown in FIGS. 1 to 3 as a representative example.

The projection zoom lens is provided in a projection display device that projects a digital image in, for example, a movie theater. The projection zoom lens includes: a first lens group $G_1$ that is fixed when power varies, has a focusing function, and has a negative refractive power; a second lens group $G_2$ with a positive refractive power, a third lens group $G_3$ with a positive refractive power, a fourth lens group $G_4$ with a negative refractive power, and a fifth lens group $G_5$ with a positive refractive power that are moved in the direction of an optical axis X relative to each other in order to continuously vary power and correct the movement of an image surface due to the continuous power variation; and a sixth lens group $G_6$ that is fixed when power varies, has a positive refractive power, and includes an aperture diaphragm 3 provided closest to a magnification side. The first to sixth lens groups are arranged in this order from the magnification side. A glass block (including a filter unit) 2, which is mainly a color composition prism, and an image display surface 1 of a light valve, such as a liquid crystal display panel, are provided on the reduction side of the projection zoom lens.

The first lens group $G_1$ having the focusing function is configured so as to have a negative refractive power. Therefore, it is easy to achieve a wide angle of view.

The aperture diaphragm 3 has the function of an aperture, and is a simple fixed aperture. When power varies, the diameter of the aperture diaphragm does not vary (is constant), and the brightness (Fno.) of the lens system is maintained to be constant in the entire power variation range. In this way, even though the projection distance varies depending on the size or shape of the indoor space of the movie theater, it is possible to project a high-quality image onto a large screen with the same brightness by moving the second lens group $G_2$, the third lens group $G_3$, the fourth lens group $G_4$, and the fifth lens group $G_5$ in the direction of the optical axis X to vary power and moving the first lens group $G_1$ in the direction of the optical axis X to perform focusing. In addition, the aperture diaphragm 3 may be a variable aperture diaphragm such that the diameter of the aperture diaphragm can be changed.

In the projection zoom lens, it is preferable that the zoom ratio be equal to or more than 1.32. In this case, when screen sizes with different aspect ratios, such as so-called Vista and Cinesco, are changed, it is possible to maintain the height direction of the image on the screen to be constant and generally respond to various situations of use using a zooming operation.

Figure 1:
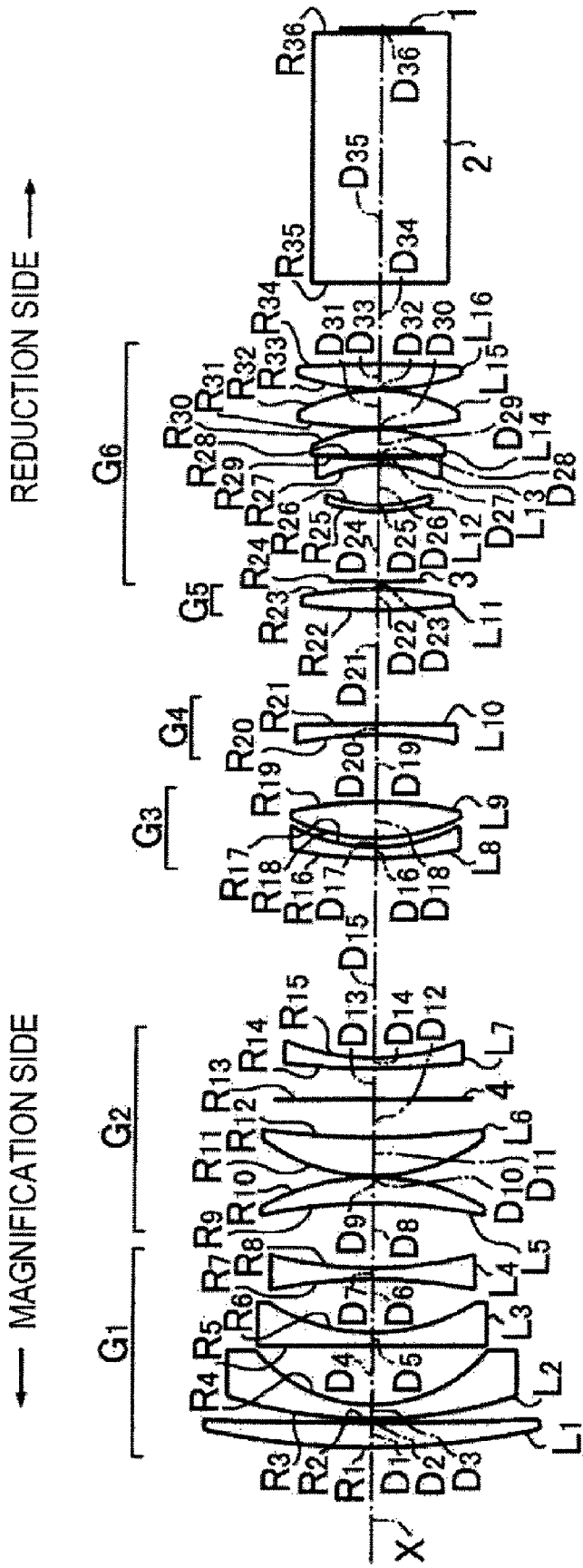
FIG. 1 is a diagram illustrating the structure of a projection zoom lens according to Example 1.

As shown in FIG. 1, the first lens group $G_1$ includes four single lenses (first to fourth lenses $L_1$ to $L_4$), and the second lens group $G_2$ includes three (two in Examples 4 and 5) single lenses (fifth to seventh lenses $L_5$ to $L_7$). The third lens group $G_3$ includes two (three in Example 5) single lenses (eighth and ninth lenses $L_8$ and $L_9$), and the fourth lens group $G_4$ includes one single lens (tenth lens $L_{10}$). The fifth lens group $G_5$ includes one single lens (eleventh lens $L_{11}$), and the sixth lens group $G_6$ includes five single lenses (twelfth to sixteenth lenses $L_{12}$ to $L_{16}$). In addition, the reduction side is substantially telecentric.

As such, in this embodiment, no cemented lens is provided and all of the lenses are single lenses. In this case, a projection display device including the projection zoom lens is configured such that it uses a xenon lamp as a light source and emits light with a very high intensity of about 2 kW, unlike the projection display device for home use or small-scale meeting. That is, when the cemented lens is used, there is a concern that an adhesive for bonding the lenses will be significantly modified and deteriorated by the high-intensity light, which results in a reduction in the performance of the lens. However, when all of the lenses are single lenses, it is possible to prevent the above-mentioned problems.

The projection zoom lens according to this embodiment is configured such that a value obtained by dividing the back focal length Bf (air equivalent distance) of the entire system by the focal length f of the entire system at a wide angle end satisfies the following Conditional expression 1:

$2.5 < Bf/f$.  [Conditional expression 1]

As such, when the back focal length of the entire system is set so as to satisfy Conditional expression 1, it is possible to ensure an appropriate space for inserting a beam splitter or a glass block as a color composition unit, such as a cross dichroic prism or a TIR prism.

In the projection zoom lens, it is preferable that the lens (fifth lens $L_5$) closest to the magnification side in the second lens group $G_2$ be a positive meniscus lens having a concave surface facing the magnification side.

When the lens closest to the reduction side in the second lens group $G_2$ is the positive lens, it is possible to refract a light beam incident from the reduction side to be close to the optical axis. Therefore, it is possible to reduce the diameter of the magnification-side lens in the second lens group $G_2$. In addition, when the lens surface closest to the magnification side in the second lens group $G_2$ is a concave surface, it is possible to diverge a light beam emitted from the second lens group $G_2$ to the magnification side. Therefore, it is possible to reduce the load of the first lens group $G_1$ with a negative refractive power.

It is preferable that an aperture 4, which is, for example, a mask, be arranged in the second lens group $G_2$. When the aperture 4 is arranged in the second lens group $G_2$, it is possible to effectively cut unnecessary marginal rays in the wide zoom range and obtain high telecentricity on the reduction side.

It is preferable that the projection zoom lens be configured so as to satisfy the following Conditional expression 2:

$3.0 < f2/f < 7.4$  [Conditional expression 2]

(where f2 indicates the focal length of the second lens group $G_2$).

If the ratio is more than the upper limit of Conditional expression 2, it is necessary to increase the diameter of the magnification-side lens in the first lens group $G_1$. On the other hand, if the ratio is less than the lower limit of Conditional expression 2, an excessively large power load is applied to the first lens group $G_1$, and it is difficult to maintain a good balance between all aberrations. It is more preferable that the projection zoom lens be configured so as to satisfy the following Conditional expression 2A:

$3.3 < f2/f < 6.5$.  [Conditional expression 2A]

It is preferable that the fifth lens group $G_5$ include one biconvex lens satisfying the following Conditional expression 3:

$70 < vd_{G5}$  [Conditional expression 3]

(where $vd_{G5}$ indicates the Abbe number of the biconvex lens in the fifth lens group $G_5$ with respect to the d-line).

In this case, it is possible to effectively correct longitudinal chromatic aberration in the entire zoom range.

It is preferable that the sixth lens group $G_6$ include a negative meniscus lens having a convex surface facing the magnification side, a negative lens having a concave surface facing the magnification side, a positive lens having a convex surface facing the reduction side, and at least one positive lens which are arranged in this order from the magnification side and satisfy the following Conditional expression 4:

$60 < vd_{G6p}$  [Conditional expression 4]

(where $vd_{G6p}$ indicates the Abbe number of each positive lens in the sixth lens group $G_6$ with respect to the d-line).

In this case, it is possible to effectively correct longitudinal chromatic aberration and lateral chromatic aberration in the entire zoom range.

It is preferable that the sixth lens group $G_6$ be configured so as to satisfy the following Conditional expressions 5 and 6:

$40 < vd_{G6n}$; and  [Conditional expression 5]

$1.8 < Nd_{G6n}$  [Conditional expression 6]

(where $vd_{G6n}$ indicates the Abbe number of each negative lens having the concave surface facing the magnification side in the sixth lens group $G_6$ with respect to the d-line, and $Nd_{G6n}$ indicates the refractive index of each negative lens having the concave surface facing the magnification side in the sixth lens group $G_6$ with respect to the d-line).

In this case, it is possible to more effectively correct longitudinal chromatic aberration and lateral chromatic aberration in the entire zoom range.

It is preferable that the projection zoom lens be configured so as to satisfy the following Conditional expression 7:

$-2.2 < f1/f < -1.0$  [Conditional expression 7]

(where f1 indicates the focal length of the first lens group $G_1$).

If the ratio is more than the upper limit of Conditional expression 7, the power load of the first lens group $G_1$ is too large and it is difficult to correct aberration. On the other hand, if the ratio is less than the lower limit of Conditional expression 7, it is difficult to obtain a wide angle of view. It is more preferable that the projection zoom lens be configured so as to satisfy the following Conditional expression 7A:

$-2.0<f1/f<-1.2.$ [Conditional expression 7A]

It is preferable that the projection zoom lens be configured so as to satisfy the following Conditional expression 8:

$3.1<f3/f<8.6$ [Conditional expression 8]

(where f3 indicates the focal length of the third lens group $G_3$).

If the ratio is more than the upper limit of Conditional expression 8, the amount of movement of the third lens group $G_3$ increases during zoom, and a power balance with other lens groups is broken. As a result, it is difficult to effectively correct aberration. On the other hand, if the ratio is less than the lower limit of Conditional expression 8, an excessively large amount of aberration occurs in the third lens group $G_3$. It is more preferable that the projection zoom lens be configured so as to satisfy the following Conditional expression 8A:

$3.4<f3/f<7.5.$ [Conditional expression 8A]

It is preferable that the projection zoom lens be configured so as to satisfy the following Conditional expression 9:

$-7.8<f4/f<-4.3$ [Conditional expression 9]

(where f4 indicates the focal length of the fourth lens group $G_4$).

If the ratio is more than the upper limit of Conditional expression 9, the divergence angle of a light beam from the fourth lens group $G_4$ to the third lens group $G_3$ increases during projection. Therefore, it is necessary to increase the diameter of the magnification-side lens group (the first lens group $G_1$ and the second lens group $G_2$), which makes it difficult to reduce the overall size of the lens system. On the other hand, if the ratio is less than the lower limit of Conditional expression 9, it is necessary to increase the amount of movement of the fourth lens group $G_4$ when power varies. As a result, the total length of the lens system increases. It is more preferable that the projection zoom lens be configured so as to satisfy the following Conditional expression 9A:

$-6.8<f4/f<-4.8.$ [Conditional expression 9A]

It is preferable that the projection zoom lens satisfy the following Conditional expression 10:

$4.1<f5/f<7.8$ [Conditional expression 10]

(where f5 indicates the focal length of the fifth lens group $G_5$).

If the ratio is more than the upper limit of Conditional expression 10, it is necessary to increase the amount of movement of the fifth lens group $G_5$ when power varies, which results in an increase in the overall length of the lens system. On the other hand, if the ratio is less than the lower limit of Conditional expression 10, it is very difficult to correct chromatic aberration. It is more preferable that the projection zoom lens be configured so as to satisfy the following Conditional expression 10A:

$4.5<f5/f<6.8$ [Conditional expression 10A]

It is preferable that the projection zoom lens according to this embodiment be configured so as to satisfy Conditional expressions 11 to 13:

$2.4<f6/f<4.1;$ [Conditional expression 11]

$2.0<D_{G6}/f<3.5;$ and [Conditional expression 12]

$1.8<|f6/f6_F|<4.8$ [Conditional expression 13]

(wherein f6 indicates the focal length of the sixth lens group $G_6$, $D_{G6}$ indicates the distance from the aperture diaphragm 3 of the sixth lens group $G_6$ to a lens surface closest to the reduction side in the sixth lens group $G_6$, and $f6_F$ indicates the distance from a lens surface closest to the magnification side in the sixth lens group $G_6$ to the focus of the sixth lens group $G_6$ on the magnification side).

Conditional expressions 11 to 13 are for appropriately setting the total length, diameter, and back focal length of the lens system while correcting all aberrations with a good balance. If the ratio is more than the upper limit of Conditional expression 11, the back focal length is too large. If the ratio is less than the lower limit of Conditional expression 11, it is difficult to effectively correct all aberrations with a good balance. If the ratio is more than the upper limit of Conditional expression 12, the total length of the lens system is too large. On the other hand, if the ratio is less than the lower limit of Conditional expression 12, the fifth lens group $G_5$ is arranged close to the reduction side. Therefore, since a cam tube or a mechanism for holding the fifth lens group $G_5$ is provided, the reduction-side lens diameter including the mechanism increases. As a result, it is difficult to attach the projection zoom lens to the projection display device according to the related art that has restrictions in a space for arranging the lens. If the absolute value is more than the upper limit of Conditional expression 13, the total length of the lens system is too large. On the other hand, if the absolute value is less than the lower limit of Conditional expression 13, it is difficult to correct all aberrations with a good balance. It is more preferable that the projection zoom lens be configured so as to satisfy the following Conditional expressions 11A to 13A:

$2.7<f6/f<3.6;$ [Conditional expression 11A]

$2.2<D_{G6}/f<3.1;$ and [Conditional expression 12A]

$2.0<|f6/f6_F|<4.2.$ [Conditional expression 13A]

Next, a projection display device according to an embodiment of the invention will be described with reference to FIGS. 17 and 18.

Figure 17:
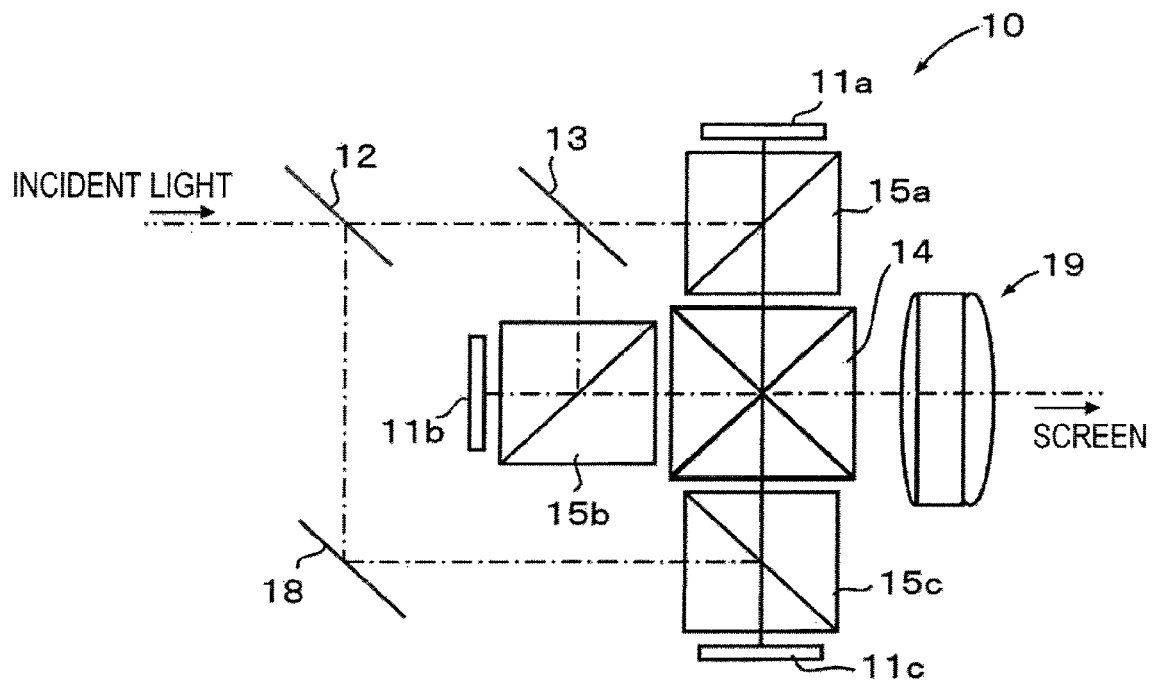
FIG. 17 is a diagram schematically illustrating a portion of a projection display device according to an embodiment of the invention.

The projection display device shown in FIG. 17 includes an illumination optical system 10 having reflective liquid crystal display panels 11a to 11c corresponding to each color light, dichroic mirrors 12 and 13 for color separation, a cross dichroic prism 14 for color composition, a total reflecting mirror 18, and polarizing prisms 15a to 15c. A light source (not shown) is provided in the front stage of the dichroic mirror 12. White light emitted from the light source is incident on the liquid crystal display panels 11a to 11c corresponding to three color light beams (G light, B light, and R light) and is then modulated. Then, the modulated light is projected onto a screen (not shown) by a projection zoom lens 19 according to the above-mentioned embodiment.

Figure 18:
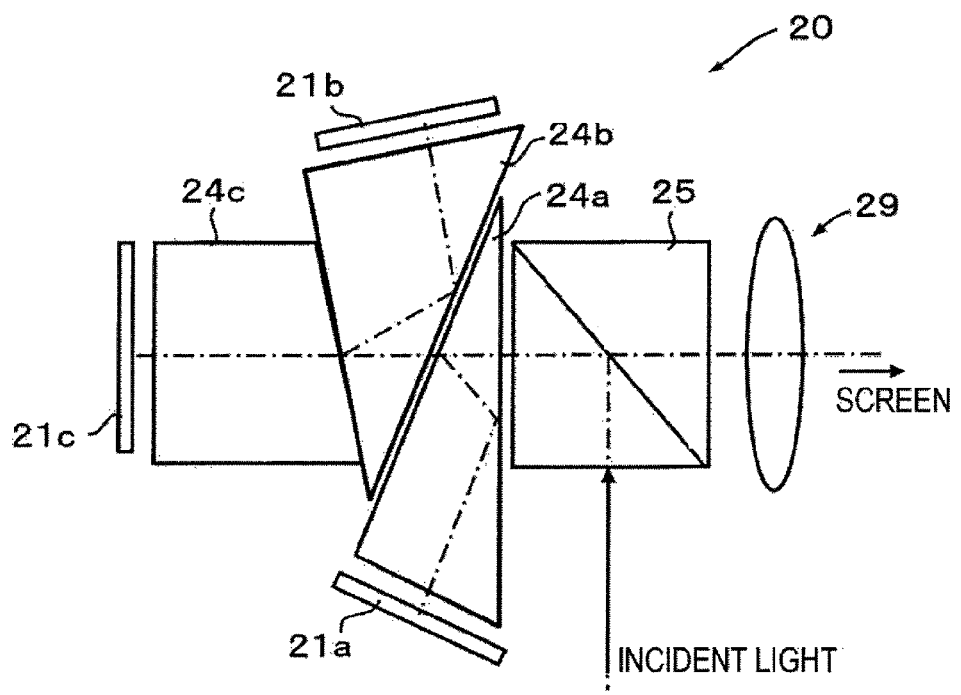
FIG. 18 is a diagram schematically illustrating a portion of a projection display device according to another embodiment of the invention.

A projection display device according to another embodiment shown in FIG. 18 includes an illumination optical system 20 having reflective liquid crystal display elements 21a to 21c corresponding to each color light, TIR prisms 24a to 24c for color separation and color composition, and a polarizing prism 25. The front stage of the polarizing prism 25 is not shown. White light emitted from a light source is incident on the liquid crystal display panels 21a to 21c corresponding to three color light beams (G light, B light, and R light) and is then modulated. Then, the modulated light is projected onto a screen (not shown) by a projection zoom lens 29 according to the above-mentioned embodiment.

The projection zoom lens according to the embodiment of the invention may be modified in various ways. For example, the number of lenses in each lens group, the curvature radius of each lens, and the gap between the lenses (or the thickness of each lens) may be appropriately changed.

The projection zoom lens according to the embodiment of the invention is suitable to be used in the projection display device including a reflective liquid crystal display panel, but the invention is not limited thereto. For example, the projection zoom lens according to the embodiment may be used as a projection zoom lens of a device using a transmissive liquid crystal display panel or a projection zoom lens of a projection display device using other light modulating units, such as DMDs.

EXAMPLES

Next, the projection zoom lens will be described using detailed examples.

Example 1

Figure 2:
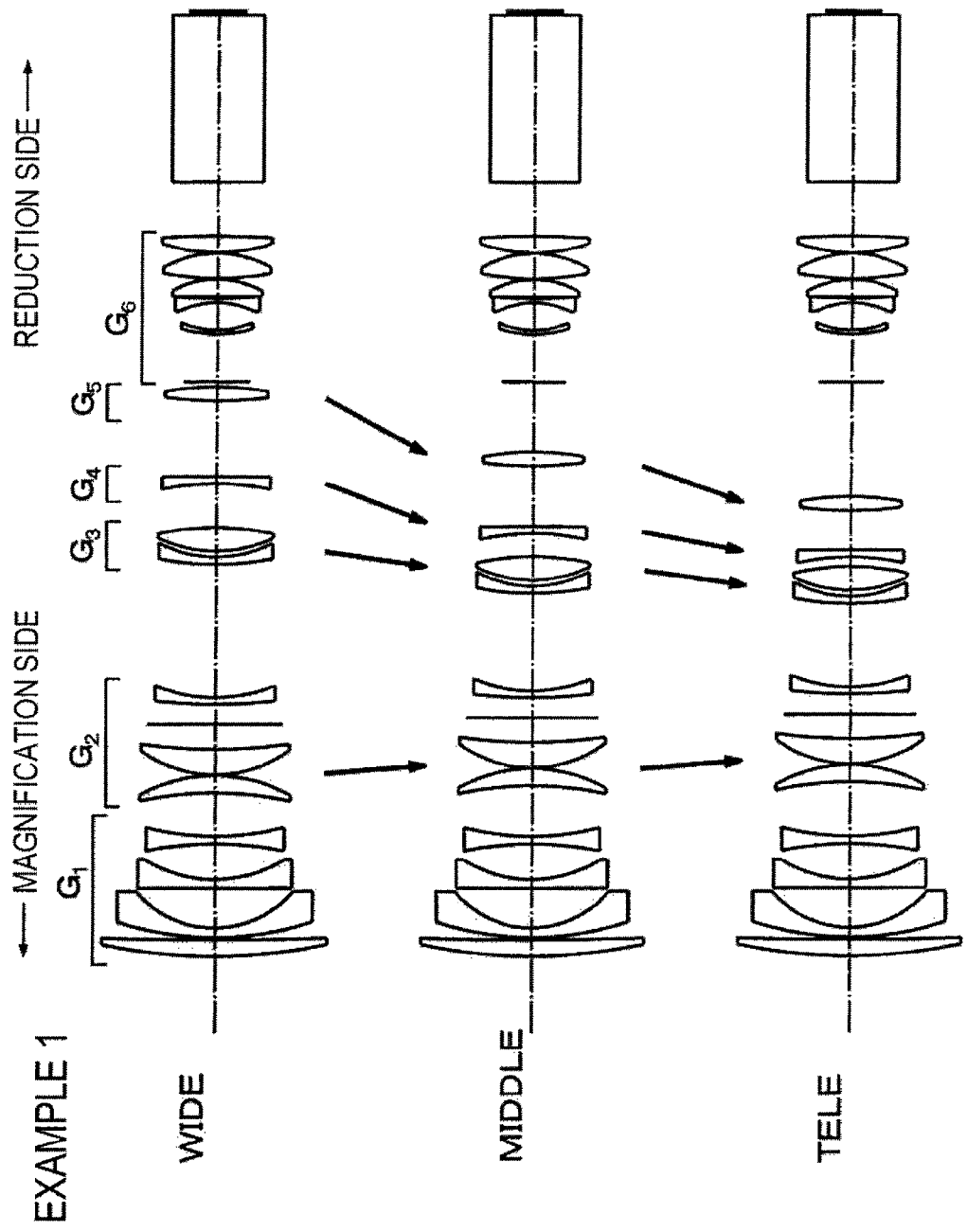
FIG. 2 is a diagram illustrating the movement of each lens group at a wide angle end (WIDE), a middle position (MIDDLE), and a telephoto end (TELE) of the projection zoom lens according to Example 1.
Figure 3:
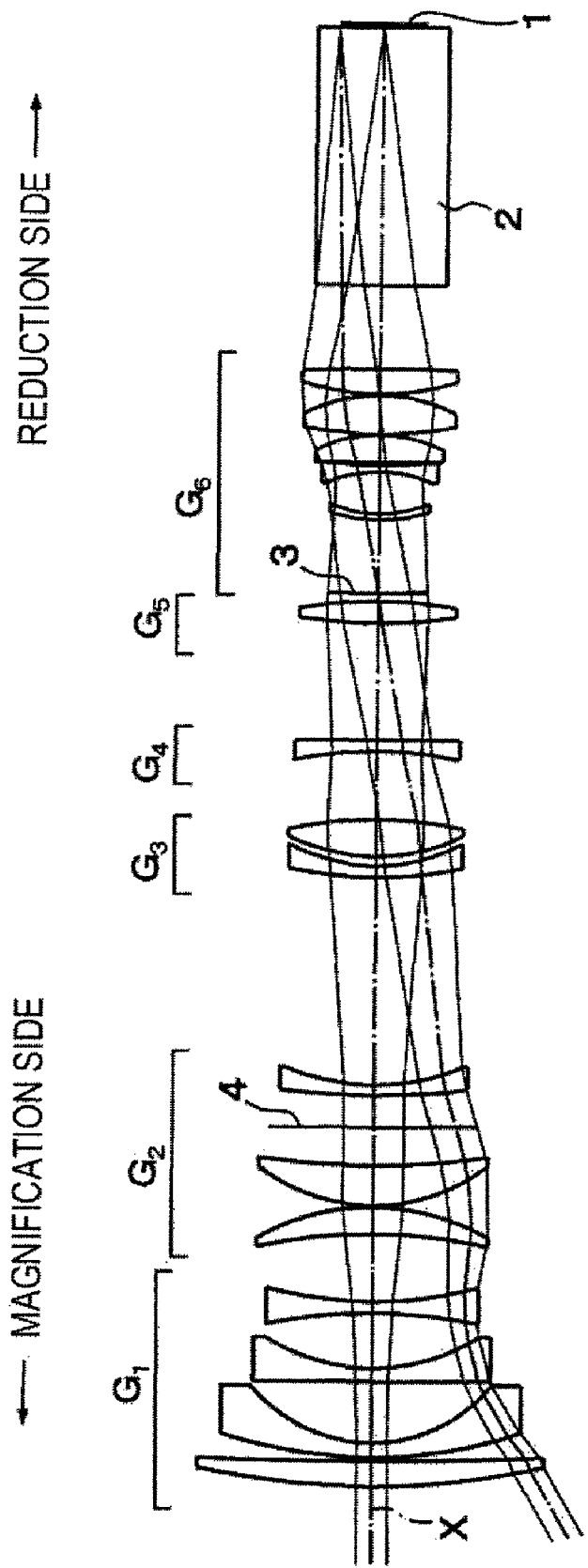
FIG. 3 is a diagram illustrating the trajectory of light beams in the projection zoom lens according to Example 1.

As described above, the projection zoom lens according to Example 1 shown in FIGS. 1 to 3 includes: a first lens group $G_1$ that is fixed when power varies, has a focusing function, and has a negative refractive power; a second lens group $G_2$ with a positive refractive power, a third lens group $G_3$ with a positive refractive power, a fourth lens group $G_4$ with a negative refractive power, and a fifth lens group $G_5$ with a positive refractive power that are moved in the direction of the optical axis X relative to each other in order to continuously vary power and correct the movement of an image surface due to the continuous power variation; and a sixth lens group $G_6$ that is fixed when power varies, has a positive refractive power, and includes an aperture diaphragm 3 provided closest to the magnification side. The first to sixth lens groups are arranged in this order from the magnification side. A glass block 2, which is mainly a color composition prism, and an image display surface 1 are provided on the reduction side of the projection zoom lens.

The first lens group $G_1$ includes a first lens $L_1$, which is a positive meniscus lens having a convex surface facing the magnification side, a second lens $L_2$, which is a negative meniscus lens having a convex surface facing the magnification side, a third lens $L_3$, which is a planoconcave lens having a concave surface facing the reduction side, and a fourth lens $L_4$ which is a biconcave lens.

The second lens group $G_2$ includes a fifth lens $L_5$, which is a positive meniscus lens having a convex surface facing the reduction side, a sixth lens $L_6$, which is a positive meniscus lens having a convex surface facing the magnification side, an aperture 4, which is, for example, a mask, and a seventh lens $L_7$, which is a negative meniscus lens having a convex surface facing the magnification side. The third lens group $G_3$ includes an eighth lens $L_8$, which is a negative meniscus lens having a convex surface facing the magnification side, and a ninth lens $L_9$ which is a biconvex lens.

The fourth lens group $G_4$ includes only a tenth lens $L_{10}$ which is a negative meniscus lens having a convex surface facing the reduction side. The fifth lens group $G_5$ includes only an eleventh lens $L_{11}$ which is a biconvex lens.

The sixth lens group $G_6$ includes a fixed aperture diaphragm 3, a twelfth lens $L_{12}$, which is a negative meniscus lens having a convex surface facing the magnification side, a thirteenth lens $L_{13}$, which is a biconcave lens, a fourteenth lens $L_{14}$, which is a planoconvex lens having a convex surface facing the reduction side, a fifteenth lens $L_{15}$, which is a biconvex lens, and a sixteenth lens $L_{16}$ which is a biconvex lens.

In Table 1, an upper part shows the focal length f of the entire system from the wide angle end to the telephoto end in Example 1 (the focal length is normalized to 1.000 when a magnification-side conjugate point is disposed at an infinite distance at the wide angle end; which is the same with Tables 2 to 5), the back focal length Bf (an air equivalent distance: a value obtained by normalizing the focal length to 1.000 when the magnification-side conjugate point is disposed at an infinite distance at the wide angle end is calculated to second decimal place; which is the same with the following tables), and Fno.

In Table 1, a middle part shows the curvature radius R of each lens surface (the focal length is normalized to 1.000 when the magnification-side conjugate point is disposed at an infinite distance at the wide angle end; which is the same with the following tables), the thickness of the center of each lens and an air space D between the lenses (which are normalized at the same focal length as the curvature radius R; which is the same with the following tables), and the refractive index Nd and the Abbe number νd of each lens with respect to the d-line. In Table 1 and Tables 2 to 5, which will be described below, numbers corresponding to R, D, Nd, and νd are sequentially increased from the magnification side.

In Table 1, a lower part shows the distance $D_8$ (variable 1) between the first lens group $G_1$ and the second lens group $G_2$, the distance $D_{15}$ (variable 2) between the second lens group $G_2$ and the third lens group $G_3$, the distance $D_{19}$ (variable 3) between the third lens group $G_3$ and the fourth lens group $G_4$, the distance $D_{21}$ (variable 4) between the fourth lens group $G_4$ and the fifth lens group $G_5$, and the distance $D_{23}$ (variable 5) between the fifth lens group $G_5$ and the sixth lens group $G_6$ at the wide angle end (WIDE: the zoom ratio is 1.000), a middle position (MIDDLE: the zoom ratio is 1.181), and the telephoto end (TELE: the zoom ratio is 1.320).

TABLE 1 f = 1.000~1.320, Bf = 3.25, Fno. = 2.50

| Surface | R | D | Nd | νd |
|---|---|---|---|---|
| 1 | 10.5381 | 0.3213 | 1.77250 | 49.6 |
| 2 | 59.5567 | 0.0490 | | |
| 3 | 6.2339 | 0.1836 | 1.49700 | 81.5 |
| 4 | 2.0225 | 0.7804 | | |
| 5 | ∞ | 0.1714 | 1.49700 | 81.5 |
| 6 | 2.6080 | 0.7031 | | |
| 7 | −6.7557 | 0.1469 | 1.61800 | 63.3 |
| 8 | 5.3815 | Variable 1 | | |

TABLE 1-continued f = 1.000~1.320, Bf = 3.25, Fno. = 2.50

| | | | | |
|---|---|---|---|---|
| 9 | −6.9325 | 0.3401 | 1.64769 | 33.8 |
| 10 | −3.0460 | 0.0163 | | |
| 11 | 2.4849 | 0.5016 | 1.48749 | 70.2 |
| 12 | 10.3946 | 0.4897 | | |
| 13 Aperture | ∞ | 0.4081 | | |
| 14 | 10.5436 | 0.1347 | 1.80518 | 25.4 |
| 15 | 3.0723 | Variable 2 | | |
| 16 | 5.7739 | 0.1428 | 1.69680 | 55.5 |
| 17 | 2.3754 | 0.1224 | | |
| 18 | 2.6514 | 0.4681 | 1.64769 | 33.8 |
| 19 | −5.2899 | Variable 3 | | |
| 20 | −4.9453 | 0.1428 | 1.80518 | 25.4 |
| 21 | −78.9388 | Variable 4 | | |
| 22 | 7.4913 | 0.2804 | 1.49700 | 81.5 |
| 23 | −5.6196 | Variable 5 | | |
| 24 Aperture diaphragm | ∞ | 0.9465 | | |
| 25 | 2.2846 | 0.0816 | 1.48749 | 70.2 |
| 26 | 1.7596 | 05367 | | |
| 27 | −1.6999 | 0.0837 | 1.83481 | 42.7 |
| 28 | 8.6887 | 0.0408 | | |
| 29 | ∞ | 0.3478 | 1.49700 | 81.5 |
| 30 | −1.8639 | 0.0163 | | |
| 31 | 5.8284 | 0.4967 | 1.49700 | 81.5 |
| 32 | −2.1502 | 0.0163 | | |
| 33 | 3.4428 | 0.3284 | 1.49700 | 81.5 |
| 34 | −18.4259 | 1.0722 | | |
| 35 | ∞ | 3.3000 | 1.51633 | 64.1 |
| 36 | ∞ | 0.0000 | | |

| Zoom ratio | Variable 1 | Variable 2 | Variable 3 | Variable 4 | Variable 5 |
|---|---|---|---|---|---|
| 1.000 (WIDE) | 0.8486 | 2.6445 | 0.8825 | 1.5080 | 0.1065 |
| 1.181 (MIDDLE) | 0.9891 | 1.9305 | 0.4602 | 1.2047 | 1.4055 |
| 1.320 (TELE) | 1.0572 | 1.6548 | 0.1955 | 0.7832 | 2.2994 |

Table 6 shows numerical values corresponding to Conditional expressions 1 to 13 according to Example 1.

In FIG. 12 and FIGS. 13 to 16, which will be described below, each spherical aberration diagram shows an aberration curve with respect to the d-line, the F-line, and the C-line. In the drawings, each astigmatism diagram shows aberration with respect to a sagittal image surface and a tangential image surface, and each lateral chromatic aberration diagram shows aberration with the F-line and the C-line.

Figure 12:
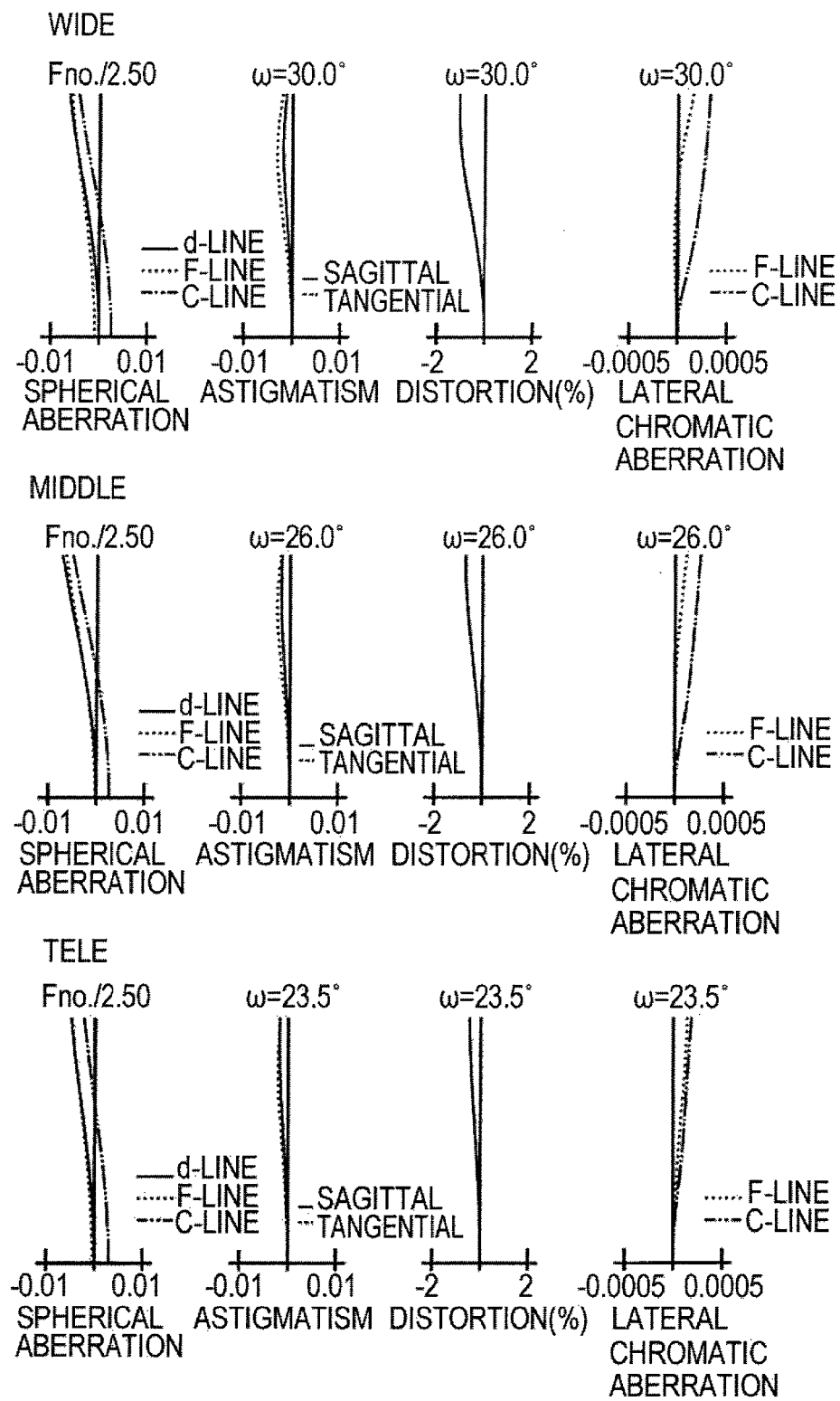
FIG. 12 is a diagram illustrating all aberrations of the projection zoom lens according to the Example 1.

As shown in the spherical aberration diagram of FIG. 12, Fno. is a constant value of 2.50 at the wide angle end (WIDE), at the middle position (MIDDLE), and the telephoto end (TELE).

As can be seen from Table 1 and FIG. 12, according to the projection zoom lens of Example 1, aberration is effectively corrected in the entire zoom range, and an appropriate back focal length and high telecentricity on the reduction side are obtained. In addition, high performances, such as high brightness, a small size, a wide angle of view, and a high zoom ratio, are obtained with the best balance therebetween. In particular, it is possible to obtain a constant F number (Fno.) of 2.50, which is a large value, in the entire zoom range.

In addition, a wide half angle of view of 30.0° is obtained at the wide angle end and the zoom ratio is set to a large value of 1.320. Therefore, the projection zoom lens is suitable for a movie theater with a relatively small projection distance and is capable of widely responding to a variation in the projection distance.

Example 2

Figure 4:
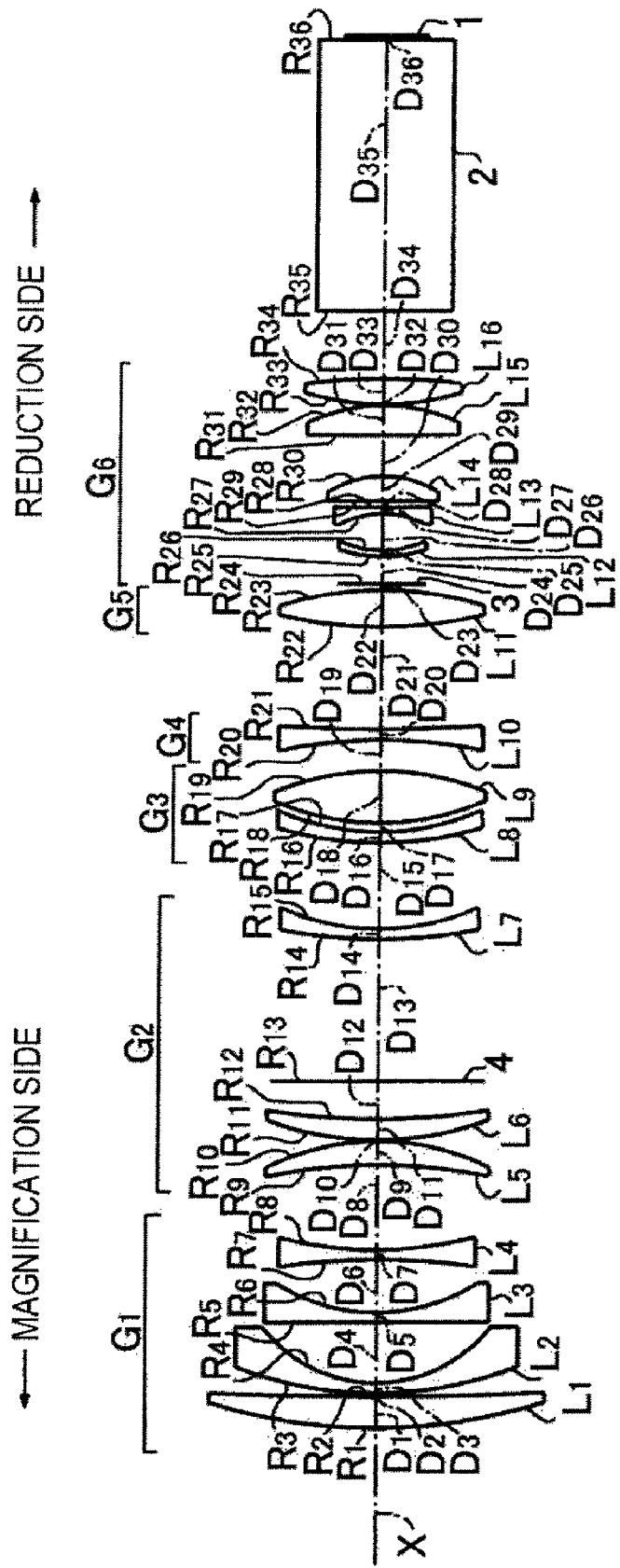
FIG. 4 is a diagram illustrating the structure of a projection zoom lens according to Example 2.

As shown in FIG. 4, the basic structure of a projection zoom lens according to Example 2 is similar to that according to Example 1 except that the tenth lens $L_{10}$ in the fourth lens group $G_4$ is a biconcave lens and the thirteenth lens $L_{13}$ in the sixth lens group $G_6$ is a planoconcave lens having a concave surface facing the magnification side, and the fourteenth lens $L_{14}$ in the sixth lens group $G_6$ is a positive meniscus lens having a concave surface facing the magnification side.

Figure 5:
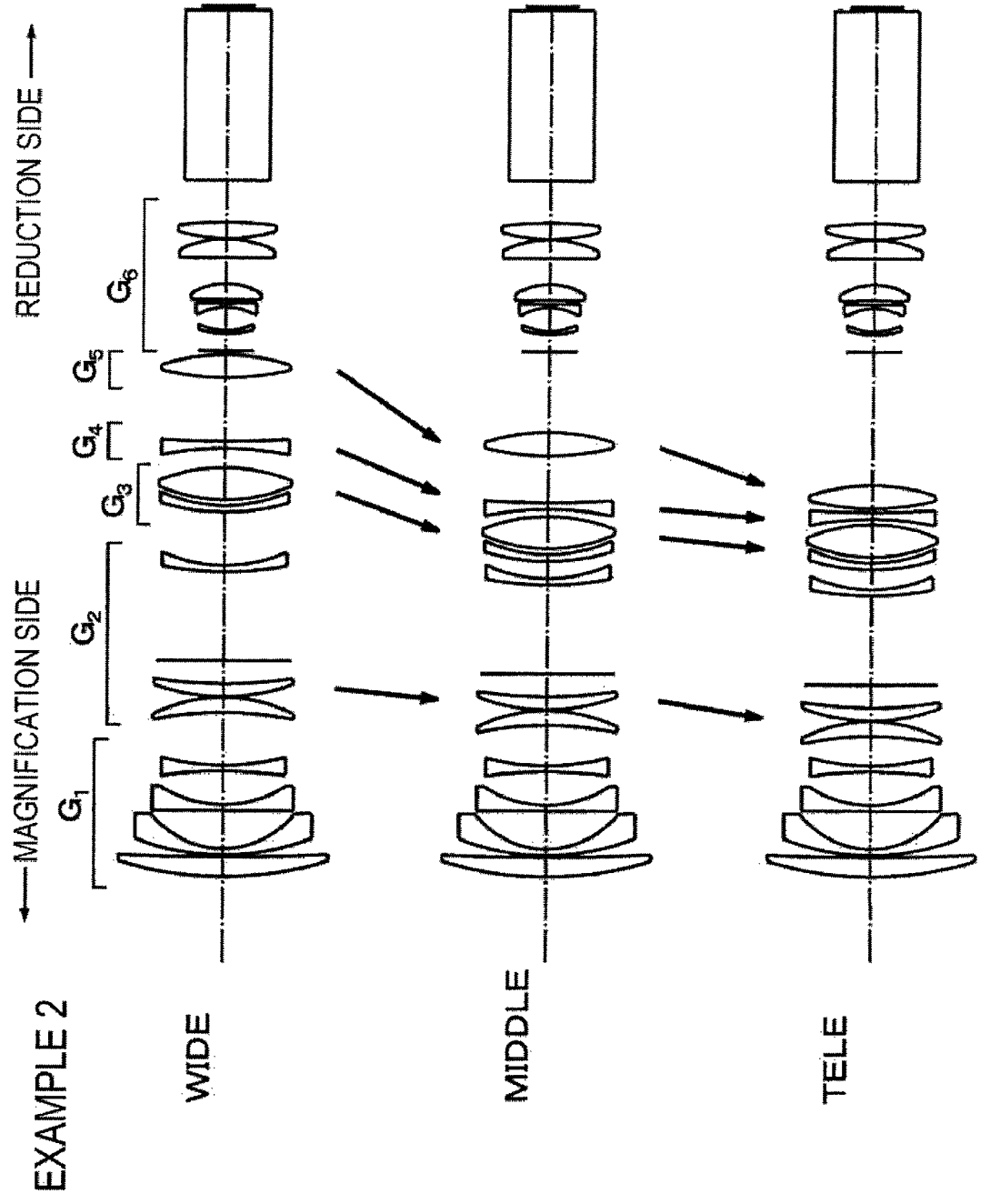
FIG. 5 is a diagram illustrating the movement of each lens group at the wide angle end (WIDE), the middle position (MIDDLE), and the telephoto end (TELE) of the projection zoom lens according to Example 2.

As shown in FIG. 5, when power varies, the first lens group $G_1$ and the sixth lens group $G_6$ are fixed and the second to fifth lens groups $G_2$ to $G_5$ are moved.

In Table 2, an upper part shows the focal length f of the entire system from the wide angle end to the telephoto end in Example 2, the back focal length Bf (air equivalent distance), and Fno.

In Table 2, a middle part shows the curvature radius R of each lens surface, the thickness of the center of each lens and the air space D between the lenses, and the refractive index Nd and the Abbe number νd of each lens with respect to the d-line.

In Table 2, a lower part shows the distance $D_8$ (variable 1) between the first lens group $G_1$ and the second lens group $G_2$, the distance $D_{15}$ (variable 2) between the second lens group $G_2$ and the third lens group $G_3$, the distance $D_{19}$ (variable 3) between the third lens group $G_3$ and the fourth lens group $G_4$, the distance $D_{21}$ (variable 4) between the fourth lens group $G_4$ and the fifth lens group $G_5$, and the distance $D_{23}$ (variable 5) between the fifth lens group $G_5$ and the sixth lens group $G_6$ at the wide angle end (WIDE: the zoom ratio is 1.000), the middle position (MIDDLE: the zoom ratio is 1.326), and the telephoto end (TELE: the zoom ratio is 1.600).

TABLE 2

| | f = 1.000~1.600, Bf = 2.99, Fno. = 2.50 | | | |
|---|---|---|---|---|
| Surface | R | D | Nd | vd |
| 1 | 6.9522 | 0.3715 | 1.77250 | 49.6 |
| 2 | 41.4141 | 0.0452 | | |
| 3 | 4.7764 | 0.1204 | 1.49700 | 81.5 |
| 4 | 1.7659 | 0.7350 | | |
| 5 | ∞ | 0.1204 | 1.49700 | 81.5 |
| 6 | 2.2943 | 0.6438 | | |
| 7 | −8.3107 | 0.1129 | 1.80100 | 35.0 |
| 8 | 4.7122 | Variable 1 | | |
| 9 | −6.7703 | 0.2854 | 1.80518 | 25.4 |
| 10 | −3.0843 | 0.0151 | | |
| 11 | 3.9445 | 0.2482 | 1.78590 | 44.2 |
| 12 | 8.6280 | 0.4515 | | |
| 13 Aperture | ∞ | 1.7297 | | |
| 14 | 6.3240 | 0.1242 | 1.80518 | 25.4 |
| 15 | 2.9258 | Variable 2 | | |
| 16 | 4.3834 | 0.1317 | 1.69895 | 30.1 |
| 17 | 3.0370 | 0.1129 | | |
| 18 | 3.2386 | 0.6279 | 1.58144 | 40.7 |
| 19 | −3.4563 | Variable 3 | | |
| 20 | −6.0952 | 0.1317 | 1.80610 | 40.9 |
| 21 | 20.4011 | Variable 4 | | |
| 22 | 5.3655 | 0.4529 | 1.49700 | 81.5 |
| 23 | −4.1118 | Variable 5 | | |
| 24 Aperture diaphragm | ∞ | 0.3328 | | |
| 25 | 1.6972 | 0.0752 | 1.51633 | 64.1 |
| 26 | 1.2728 | 0.4477 | | |
| 27 | −1.1468 | 0.0771 | 1.83481 | 42.7 |
| 28 | ∞ | 0.0774 | | |
| 29 | −91.2347 | 0.3036 | 1.49700 | 81.5 |
| 30 | −1.2857 | 0.5039 | | |
| 31 | 395.4634 | 0.3574 | 1.49700 | 81.5 |
| 32 | −2.1542 | 0.0151 | | |
| 33 | 3.3545 | 0.3113 | 1.49700 | 81.5 |
| 34 | −7.5519 | 0.8180 | | |
| 35 | ∞ | 3.3000 | 1.51633 | 64.1 |
| 36 | ∞ | 0.0000 | | |

| Zoom ratio | Variable 1 | Variable 2 | Variable 3 | Variable 4 | Variable 5 |
|---|---|---|---|---|---|
| 1.000 (WIDE) | 1.0151 | 1.0401 | 0.3775 | 1.2428 | 0.0752 |
| 1.326 (MIDDLE) | 0.7765 | 0.3383 | 0.1397 | 0.9173 | 1.5790 |
| 1.600 (TELE) | 0.5684 | 0.3873 | 0.1129 | 0.0737 | 2.6084 |

Table 6 shows numerical values corresponding to Conditional expressions 1 to 13 according to Example 2.

Figure 13:
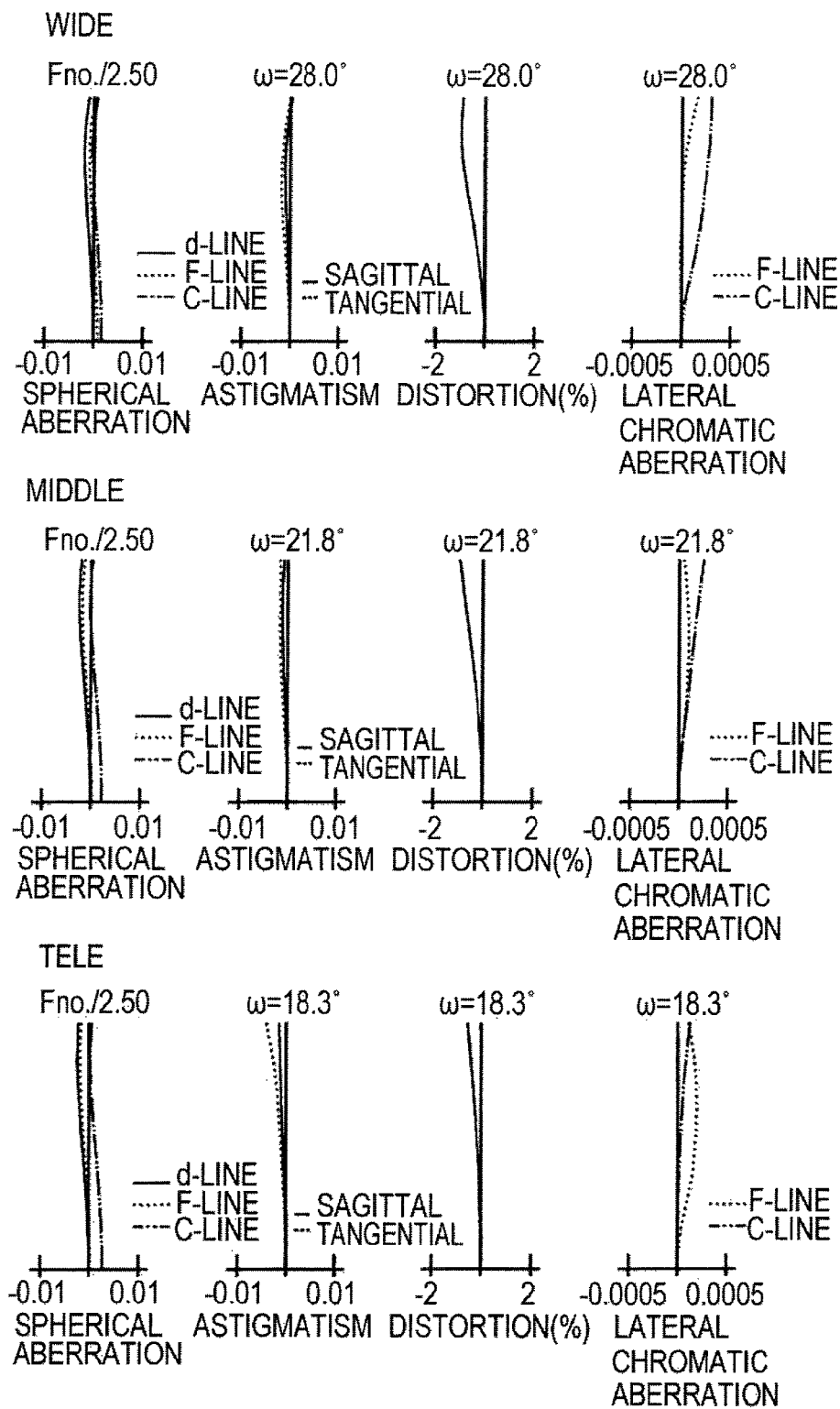
FIG. 13 is a diagram illustrating all aberrations of the projection zoom lens according to the Example 2.

As can be seen from Table 2 and FIG. 13, according to the projection zoom lens of Example 2, aberration is effectively corrected in the entire zoom range, and an appropriate back focal length and high telecentricity on the reduction side are obtained. In addition, high performances, such as high brightness, a small size, a wide angle of view, and a high zoom ratio, are obtained with the best balance therebetween. In particular, it is possible to obtain a constant F number (Fno.) of 2.50, which is a large value, in the entire zoom range.

In addition, a wide half angle of view of 28.0° is obtained at the wide angle end and the zoom ratio is set to a large value of 1.600. Therefore, the projection zoom lens is suitable for a movie theater with a relatively small projection distance and is capable of widely responding to a variation in the projection distance.

Example 3

Figure 6:
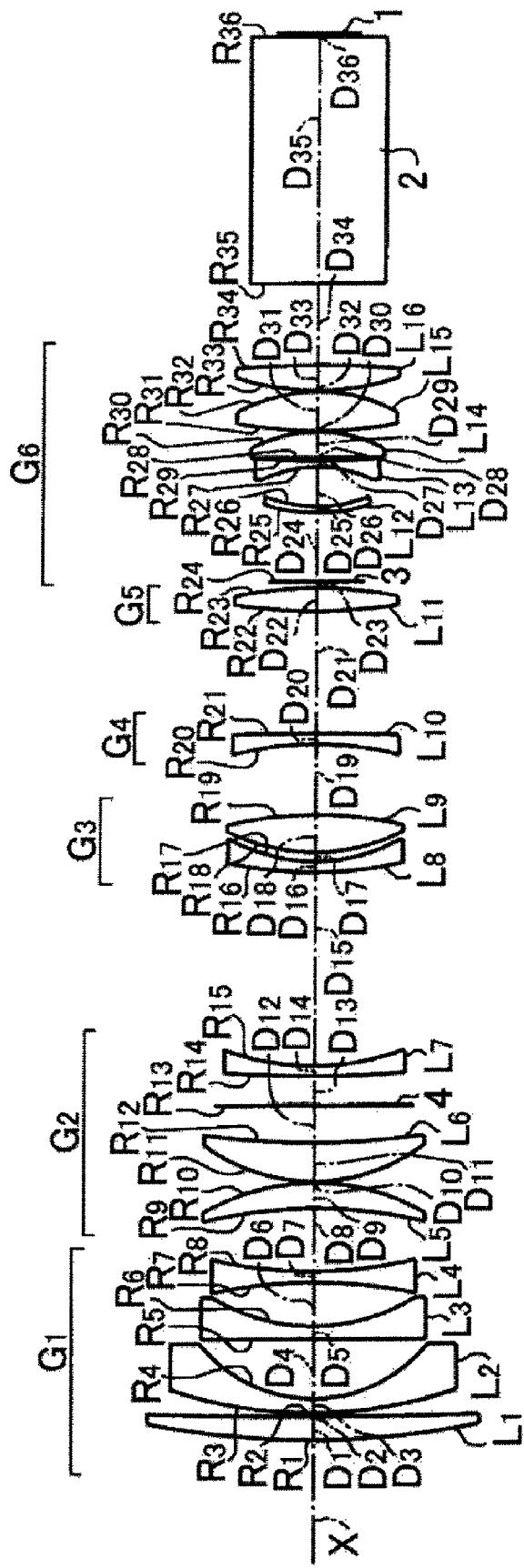
FIG. 6 is a diagram illustrating the structure of a projection zoom lens according to Example 3.

As shown in FIG. 6, the basic structure of a projection zoom lens according to Example 3 is similar to that according to Example 1.

Figure 7:
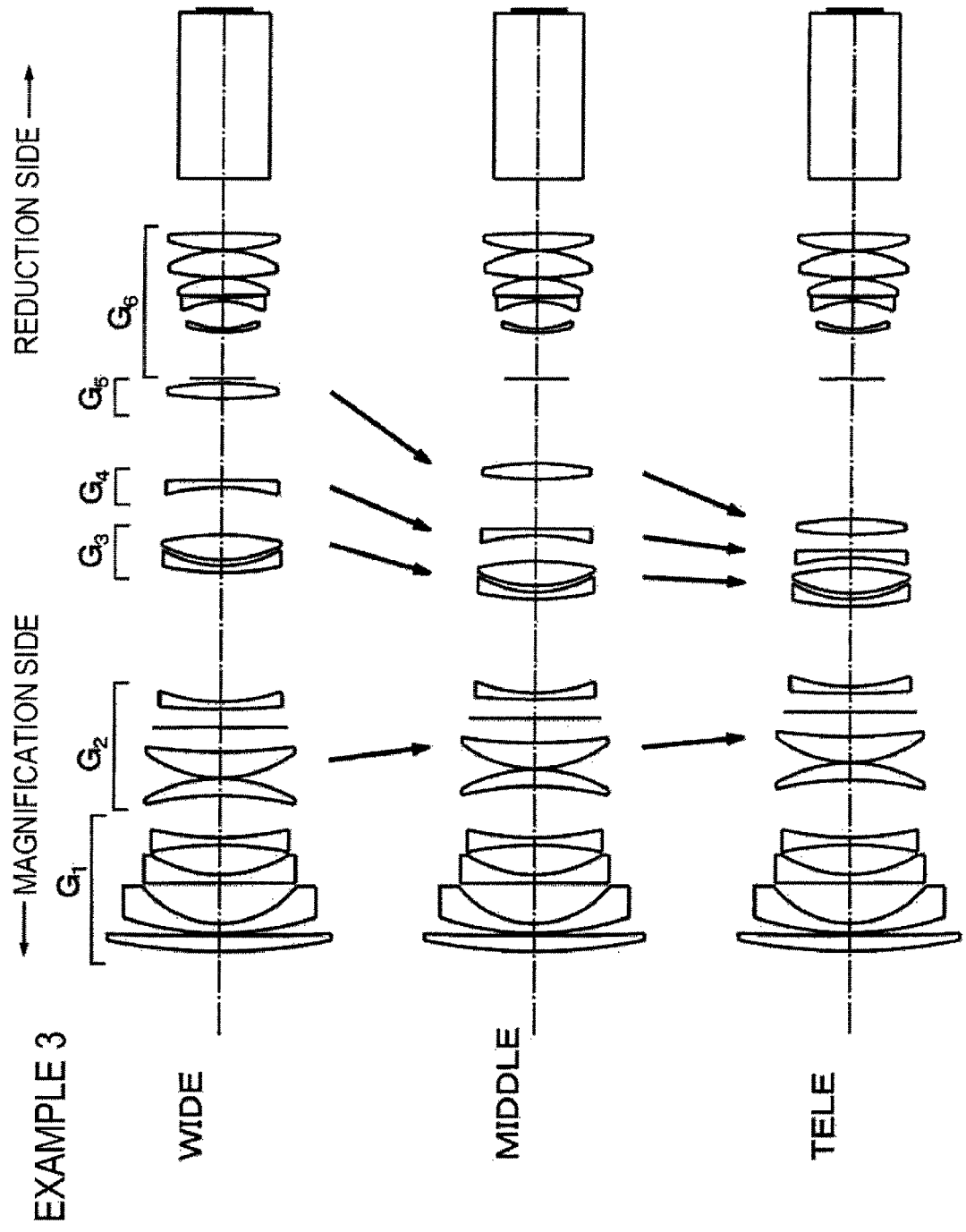
FIG. 7 is a diagram illustrating the movement of each lens group at the wide angle end (WIDE); the middle position (MIDDLE), and the telephoto end (TELE) of the projection zoom lens according to Example 3.

As shown in FIG. 7, when power varies, the first lens group $G_1$ and the sixth lens group $G_6$ are fixed, and the second to fifth lens groups $G_2$ to $G_5$ are moved.

In Table 3, an upper part shows the focal length f of the entire system from the wide angle end to the telephoto end in Example 3, the back focal length Bf (air equivalent distance), and Fno.

In Table 3, a middle part shows the curvature radius R of each lens surface, the thickness of the center of each lens and the air space D between the lenses, and the refractive index Nd and the Abbe number vd of each lens with respect to the d-line.

In Table 3, a lower part shows the distance $D_8$ (variable 1) between the first lens group $G_1$ and the second lens group $G_2$, the distance $D_{15}$ (variable 2) between the second lens group $G_2$ and the third lens group $G_3$, the distance $D_{19}$ (variable 3) between the third lens group $G_3$ and the fourth lens group $G_4$, the distance $D_{21}$ (variable 4) between the fourth lens group $G_4$ and the fifth lens group $G_5$, and the distance $D_{23}$ (variable 5) between the fifth lens group $G_5$ and the sixth lens group $G_6$ at the wide angle end (WIDE: the zoom ratio is 1.000), the middle position (MIDDLE: the zoom ratio is 1.234), and the telephoto end (TELE: the zoom ratio is 1.420).

TABLE 3 f = 1.000~1.420, Bf = 3.27, Fno. = 2.50

| Surface | R | D | Nd | νd |
|---|---|---|---|---|
| 1 | 11.1396 | 0.3128 | 1.77250 | 49.6 |
| 2 | 66.9562 | 0.0492 | | |
| 3 | 6.0760 | 0.1846 | 1.49700 | 81.5 |
| 4 | 1.9619 | 0.7969 | | |
| 5 | ∞ | 0.1723 | 1.49700 | 81.5 |
| 6 | 2.5713 | 0.5910 | | |
| 7 | −6.6939 | 0.1477 | 1.61800 | 63.3 |
| 8 | 5.9851 | Variable 1 | | |
| 9 | −6.3845 | 0.3369 | 1.64769 | 33.8 |
| 10 | −3.0006 | 0.0164 | | |
| 11 | 2.4779 | 0.5141 | 1.48749 | 70.2 |
| 12 | 10.4613 | 0.4923 | | |
| 13 Aperture | ∞ | 0.3746 | | |
| 14 | 15.6384 | 0.1354 | 1.80518 | 25.4 |
| 15 | 3.4203 | Variable 2 | | |
| 16 | 5.4646 | 0.1436 | 1.69680 | 55.5 |
| 17 | 2.3511 | 0.1231 | | |
| 18 | 2.6338 | 0.5007 | 1.64769 | 33.8 |
| 19 | −5.2156 | Variable 3 | | |
| 20 | −4.5297 | 0.1436 | 1.80518 | 25.4 |
| 21 | −59.5554 | Variable 4 | | |
| 22 | 7.1599 | 0.3125 | 1.49700 | 81.5 |
| 23 | −5.7510 | Variable 5 | | |
| 24 Aperture diaphragm | ∞ | 0.9271 | | |
| 25 | 2.4038 | 0.0821 | 1.48749 | 70.2 |
| 26 | 1.8260 | 0.5346 | | |
| 27 | −1.7681 | 0.0841 | 1.83481 | 42.7 |
| 28 | 9.1667 | 0.0410 | | |
| 29 | ∞ | 0.3456 | 1.49700 | 81.5 |
| 30 | −1.9212 | 0.0164 | | |
| 31 | 5.9742 | 0.5226 | 1.49700 | 81.5 |
| 32 | −2.2658 | 0.0164 | | |
| 33 | 3.4779 | 0.3433 | 1.49700 | 81.5 |
| 34 | −13.9826 | 1.0890 | | |
| 35 | ∞ | 3.3000 | 1.51633 | 64.1 |
| 36 | ∞ | 0.0000 | | |

| Zoom ratio | Variable 1 | Variable 2 | Variable 3 | Variable 4 | Variable 5 |
|---|---|---|---|---|---|
| 1.000 (WIDE) | 0.8288 | 2.5873 | 0.9530 | 1.6448 | 0.0922 |
| 1.234 (MIDDLE) | 1.0191 | 1.8728 | 0.5113 | 0.9947 | 1.7082 |
| 1.420 (TELE) | 1.1403 | 1.6065 | 0.2157 | 0.3202 | 2.8233 |

Table 6 shows numerical values corresponding to Conditional expressions 1 to 13 according to Example 3.

Figure 14:
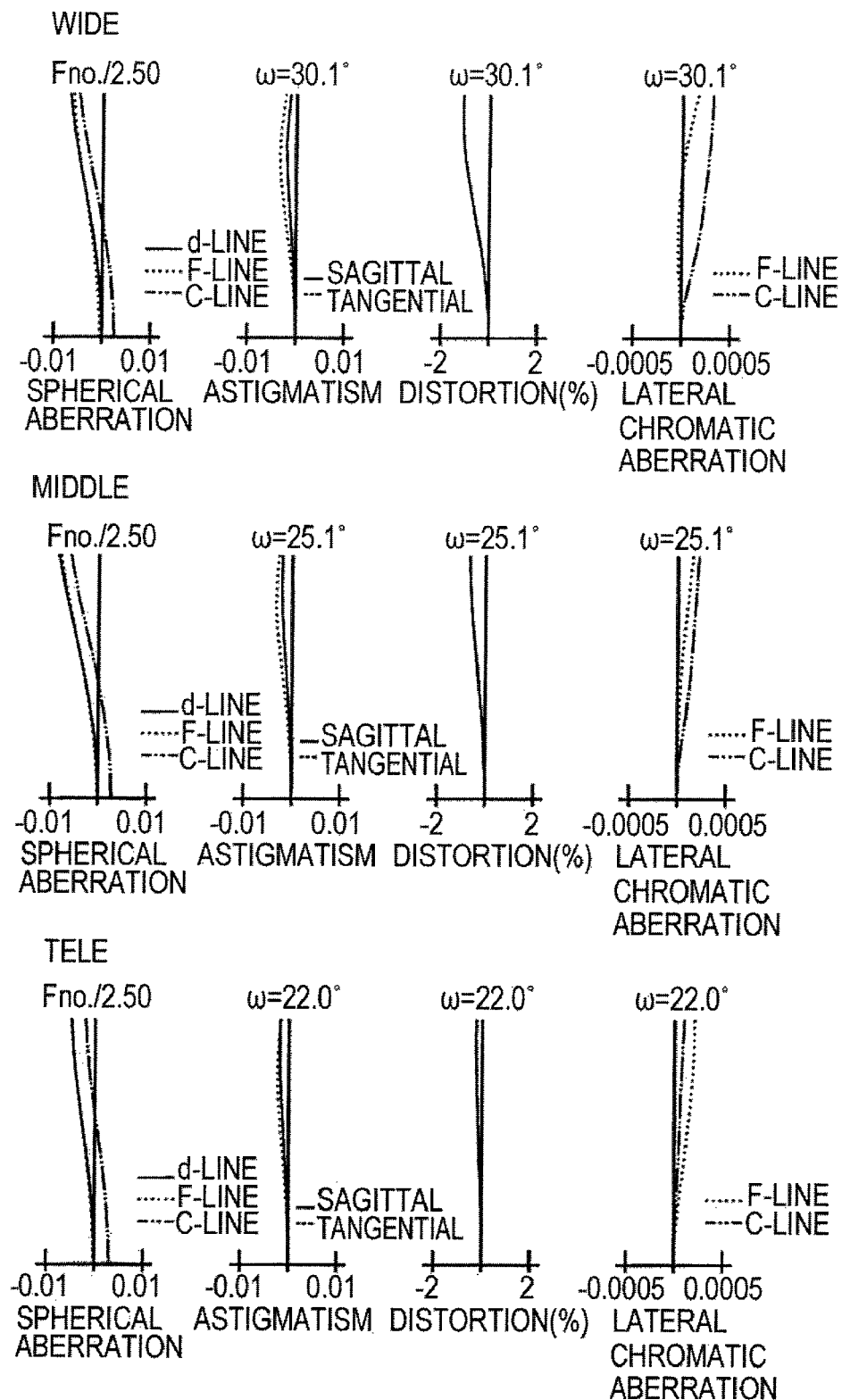
FIG. 14 is a diagram illustrating all aberrations of the projection zoom lens according to the Example 3.

As can be seen from Table 3 and FIG. 14, according to the projection zoom lens of Example 3, aberration is effectively corrected in the entire zoom range, and an appropriate back focal length and high telecentricity on the reduction side are obtained. In addition, high performances, such as high brightness, a small size, wide angle of view, and a high zoom ratio, are obtained with the best balance therebetween. In particular, it is possible to obtain a constant F number (Fno.) of 2.50, which is a large value, in the entire zoom range.

In addition, a wide half angle of view of 30.1° is obtained at the wide angle end and the zoom ratio is set to a large value of 1.420. Therefore, the projection zoom lens is suitable for a movie theater with a relatively small projection distance and is capable of widely responding to a variation in the projection distance.

Example 4

Figure 8:
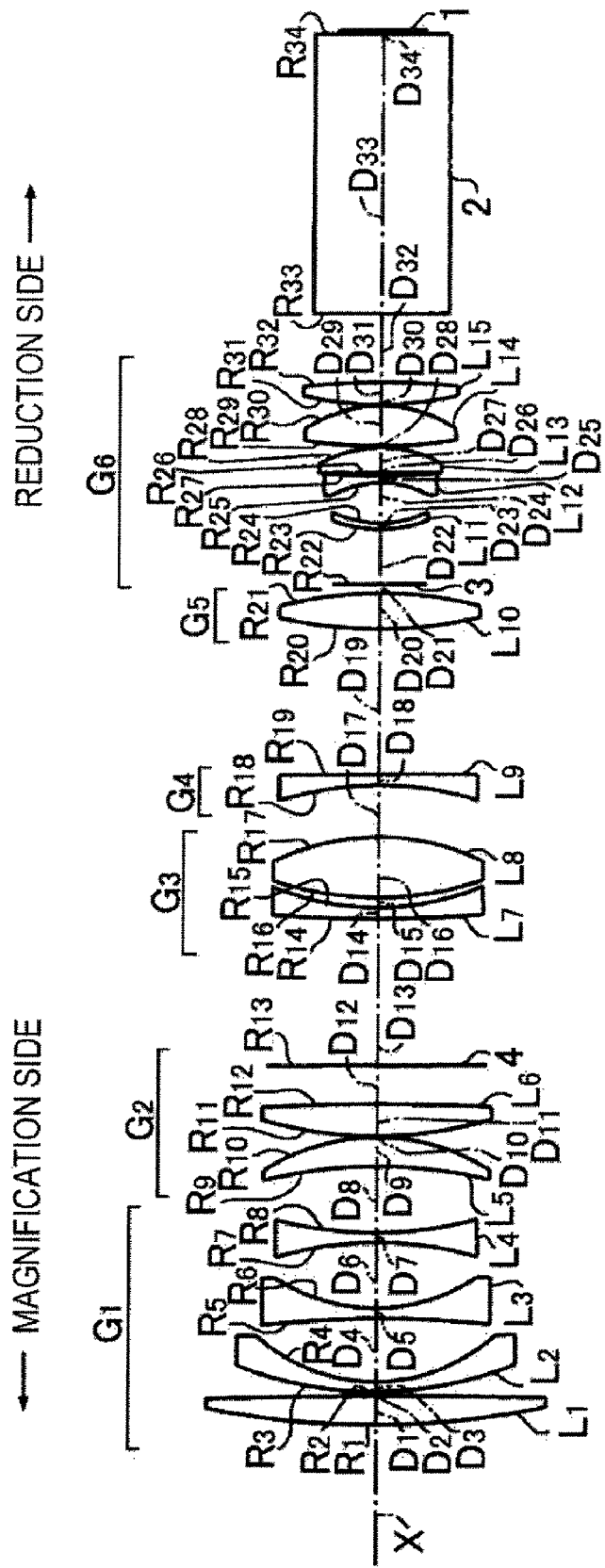
FIG. 8 is a diagram illustrating the structure of a projection zoom lens according to Example 4.

As shown in FIG. 8, the basic structure of a projection zoom lens according to Example 4 is similar to that according to Example 1 except that the first lens $L_1$ in the first lens group $G_1$ is a biconvex lens, the third lens $L_3$ in the first lens group $G_1$ is a biconcave lens, the number of lenses in the second lens group $G_2$ is one less than that in the second lens group $G_2$ according to Example 1, the second lens group $G_2$ includes the fifth lens $L_5$, which is a positive meniscus lens having a convex surface facing the reduction side, and the sixth lens $L_6$, which is a biconvex lens, and the aperture 4, which is, for example, a mask, and the thirteenth lens $L_{13}$ (corresponding to the fourteenth lens $L_{14}$ in Example 1), which is a third lens from the aperture diaphragm 3 to the reduction side in the sixth lens group $G_6$, is a positive meniscus lens having a convex surface facing the reduction side.

Figure 9:
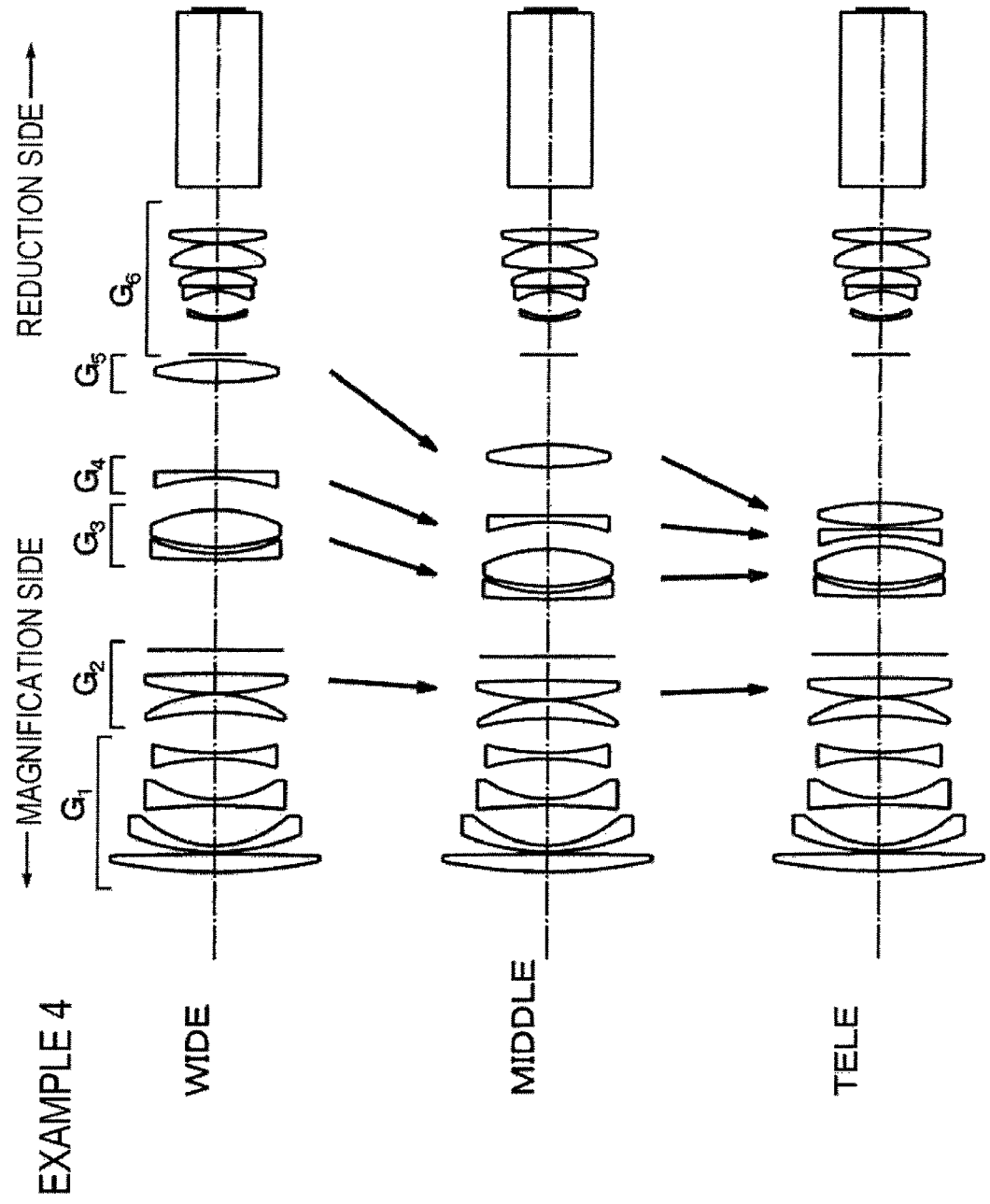
FIG. 9 is a diagram illustrating the movement of each lens group at the wide angle end (WIDE), the middle position (MIDDLE), and the telephoto end (TELE) of the projection zoom lens according to Example 4.

As shown in FIG. 9, when power varies, the first lens group $G_1$ and the sixth lens group $G_6$ are fixed, and the second to fifth lens groups $G_2$ to $G_5$ are moved.

In Table 4, an upper part shows the focal length f of the entire system from the wide angle end to the telephoto end in Example 4, the back focal length Bf (air equivalent distance), and Fno.

In Table 4, a middle part shows the curvature radius R of each lens surface, the thickness of the center of each lens and the air space D between the lenses, and the refractive index Nd and the Abbe number νd of each lens with respect to the d-line.

In Table 4, a lower part shows the distance $D_8$ (variable 1) between the first lens group $G_1$ and the second lens group $G_2$, the distance $D_{13}$ (variable 2) between the second lens group $G_2$ and the third lens group $G_3$, the distance $D_{17}$ (variable 3) between the third lens group $G_3$ and the fourth lens group $G_4$, the distance $D_{19}$ (variable 4) between the fourth lens group $G_4$ and the fifth lens group $G_5$, and the distance $D_{21}$ (variable 5) between the fifth lens group $G_5$ and the sixth lens group $G_6$ at the wide angle end (WIDE: the zoom ratio is 1.000), the middle position (MIDDLE: the zoom ratio is 1.286), and the telephoto end (TELE: the zoom ratio is 1.520).

TABLE 4 f = 1.000~1.520, Bf = 2.98, Fno. = 2.50

| Surface | R | D | Nd | vd |
|---|---|---|---|---|
| 1 | 10.0372 | 0.3370 | 1.74747 | 53.3 |
| 2 | −83.7226 | 0.0450 | | |
| 3 | 4.3879 | 0.1199 | 1.58934 | 61.6 |
| 4 | 2.0839 | 0.7468 | | |
| 5 | −12.1746 | 0.1199 | 1.49700 | 81.5 |
| 6 | 2.1211 | 0.7716 | | |
| 7 | −4.2107 | 0.1124 | 1.59912 | 61.2 |
| 8 | 4.6376 | Variable 1 | | |
| 9 | −5.6276 | 0.3373 | 1.59136 | 38.9 |
| 10 | −2.5092 | 0.0150 | | |
| 11 | 4.8549 | 0.3714 | 1.58032 | 40.0 |
| 12 | −30.0100 | 0.4496 | | |
| 13 Aperture | ∞ | Variable 2 | | |
| 14 | 17.3333 | 0.1311 | 1.63300 | 59.8 |
| 15 | 3.1551 | 0.1199 | | |
| 16 | 3.8847 | 0.7079 | 1.48000 | 58.8 |
| 17 | −2.8282 | Variable 3 | | |
| 18 | −3.9246 | 0.1311 | 1.81000 | 30.0 |
| 19 | −92.6417 | Variable 4 | | |
| 20 | 5.2718 | 0.4268 | 1.49700 | 81.5 |
| 21 | −4.6068 | Variable 5 | | |
| 22 Aperture diaphragm | ∞ | 0.6563 | | |
| 23 | 1.5881 | 0.0749 | 1.48000 | 58.8 |
| 24 | 1.2961 | 0.4797 | | |
| 25 | −1.1790 | 0.0768 | 1.60949 | 47.1 |
| 26 | 6.8364 | 0.0375 | | |
| 27 | −205.4269 | 0.2998 | 1.49700 | 81.5 |
| 28 | −1.4777 | 0.0150 | | |
| 29 | 5.7907 | 0.4608 | 1.49700 | 81.5 |
| 30 | −1.6014 | 0.0150 | | |
| 31 | 3.9618 | 0.2652 | 1.53915 | 62.5 |
| 32 | −9.0317 | 0.8058 | | |
| 33 | ∞ | 3.3000 | 1.51633 | 64.1 |
| 34 | ∞ | 0.0000 | | |

| Zoom ratio | Variable 1 | Variable 2 | Variable 3 | Variable 4 | Variable 5 |
|---|---|---|---|---|---|
| 1.000 (WIDE) | 0.7698 | 1.7196 | 0.6030 | 1.6996 | 0.1018 |
| 1.286 (MIDDLE) | 0.6468 | 1.0956 | 0.5076 | 0.9270 | 1.7167 |
| 1.520 (TELE) | 0.6851 | 1.0996 | 0.1954 | 0.0741 | 2.8395 |

Table 6 shows numerical values corresponding to Conditional expressions 1 to 13 according to Example 4.

As can be seen from Table 4 and FIG. 15, according to the projection zoom lens of Example 4, aberration is effectively corrected in the entire zoom range, and an appropriate back focal length and high telecentricity on the reduction side are obtained. In addition, high performances, such as high brightness, a small size, a wide angle of view, and a high zoom ratio, are obtained with the best balance therebetween. In particular, it is possible to obtain a constant F number (Fno.) of 2.50, which is a large value, in the entire zoom range.

In addition, a wide half angle of view of 27.9° is obtained at the wide angle end and the zoom ratio is set to a large value of 1.520. Therefore, the projection zoom lens is suitable for a movie theater with a relatively small projection distance and is capable of widely responding to a variation in the projection distance.

Example 5

Figure 10:
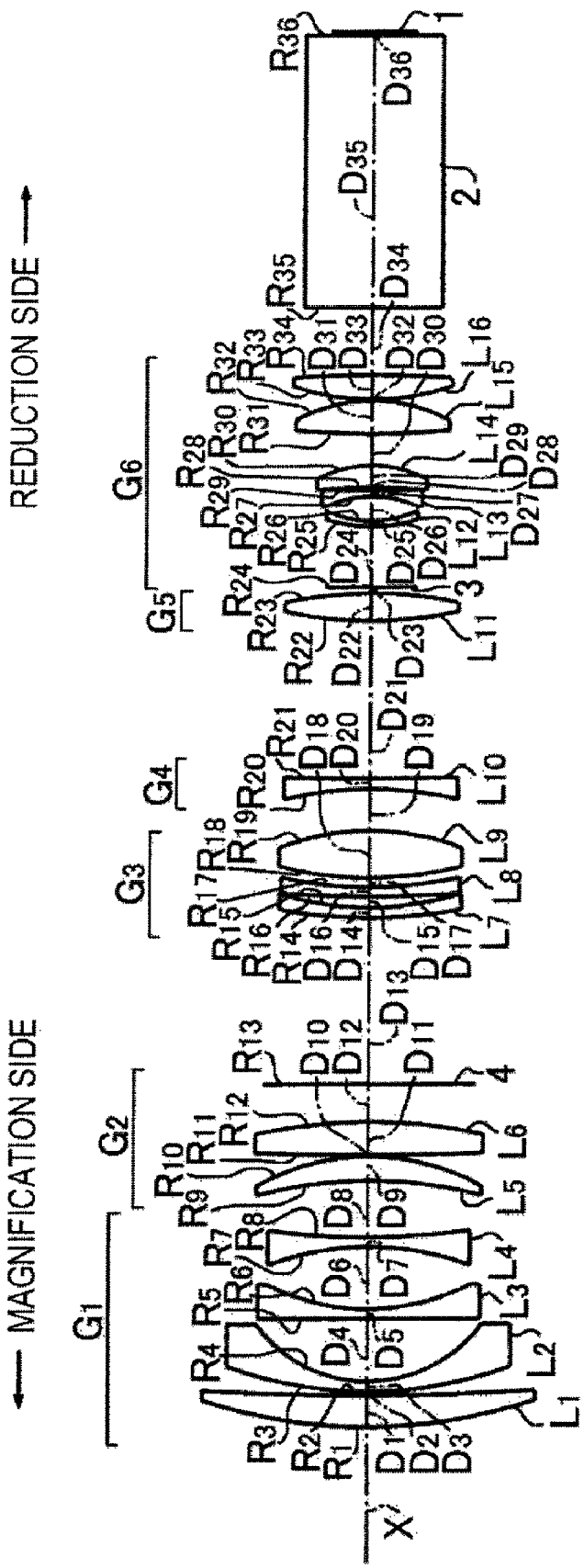
FIG. 10 is a diagram illustrating the structure of a projection zoom lens according to Example 5.

As shown in FIG. 10, the basic structure of a projection zoom lens according to Example 5 is similar to that according to Example 1 except that the number of lenses in the second lens group $G_2$ is one less than that in the second lens group $G_2$ according to Example 1, the second lens group $G_2$ includes the fifth lens $L_5$, which is a positive meniscus lens having a convex surface facing the reduction side, the sixth lens $L_6$, which is a biconvex lens, and the aperture 4, which is, for example, a mask, the tenth lens $L_{10}$ in the fourth lens group $G_4$ is a biconcave lens, and the fourteenth lens $L_{14}$ in the sixth lens group $G_6$ is a positive meniscus lens having a convex surface facing the reduction side.

Figure 11:
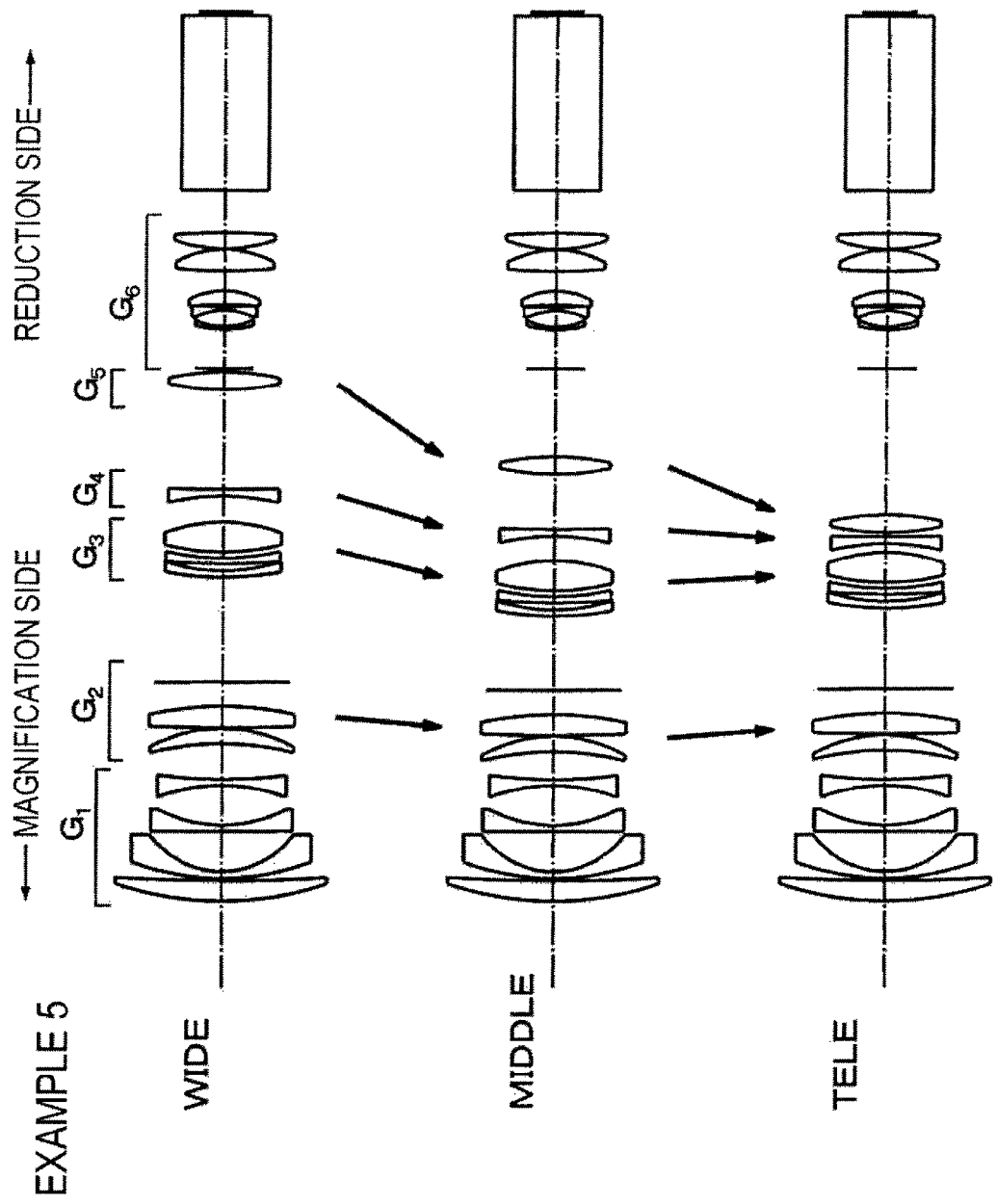
FIG. 11 is a diagram illustrating the movement of each lens group at the wide angle end (WIDE), the middle position (MIDDLE), and the telephoto end (TELE) of the projection zoom lens according to Example 5.

As shown in FIG. 11, when power varies, the first lens group $G_1$ and the sixth lens group $G_6$ are fixed and the second to fifth lens groups $G_2$ to $G_5$ are moved.

In Table 5, an upper part shows the focal length f of the entire system from the wide angle end to the telephoto end in Example 5, the back focal length Bf (air equivalent distance), and Fno.

In Table 5, a middle part shows the curvature radius R of each lens surface, the thickness of the center of each lens and the air space D between the lenses, and the refractive index Nd and the Abbe number vd of each lens with respect to the d-line.

In Table 5, a lower part shows the distance $D_8$ (variable 1) between the first lens group $G_1$ and the second lens group $G_2$, the distance $D_{13}$ (variable 2) between the second lens group $G_2$ and the third lens group $G_3$, the distance $D_{19}$ (variable 3) between the third lens group $G_3$ and the fourth lens group $G_4$, the distance $D_{21}$ (variable 4) between the fourth lens group $G_4$ and the fifth lens group $G_5$, and the distance $D_{23}$ (variable 5)

between the fifth lens group $G_5$ and the sixth lens group $G_6$ at the wide angle end (WIDE: the zoom ratio is 1.000), the middle position (MIDDLE: the zoom ratio is 1.286), and the telephoto end (TELE: the zoom ratio is 1.520).

ness, a small size, a wide angle of view, and a high zoom ratio, are obtained with the best balance therebetween. In particular, it is possible to obtain a constant F number (Fno.) of 2.50, which is a large value, in the entire zoom range.

TABLE 5 f = 1.000~1.520, Bf = 2.98, Fno. = 2.50

| Surface | R | D | Nd | vd |
|---|---|---|---|---|
| 1 | 6.4393 | 0.3753 | 1.77250 | 49.6 |
| 2 | 32.1904 | 0.0450 | | |
| 3 | 4.9519 | 0.1199 | 1.49700 | 81.5 |
| 4 | 1.6834 | 0.7551 | | |
| 5 | ∞ | 0.1199 | 1.49700 | 81.5 |
| 6 | 2.6412 | 0.7548 | | |
| 7 | −3.4581 | 0.1124 | 1.80518 | 25.4 |
| 8 | 8.8280 | Variable 1 | | |
| 9 | −5.4880 | 0.2879 | 1.80518 | 25.4 |
| 10 | −2.8118 | 0.0150 | | |
| 11 | 31.2952 | 0.4015 | 1.75520 | 27.5 |
| 12 | −6.5134 | 0.4495 | | |
| 13 Aperture | ∞ | Variable 2 | | |
| 14 | 5.9966 | 0.1236 | 1.80100 | 35.0 |
| 15 | 3.6476 | 0.1333 | | |
| 16 | 14.7956 | 0.1124 | 1.71300 | 53.9 |
| 17 | 4.9297 | 0.1124 | | |
| 18 | 4.5062 | 0.5680 | 1.58144 | 40.7 |
| 19 | −3.0757 | Variable 3 | | |
| 20 | −4.5991 | 01311 | 1.80518 | 25.4 |
| 21 | 47.8592 | Variable 4 | | |
| 22 | 5.0564 | 0.3334 | 1.48749 | 70.2 |
| 23 | −4.9499 | Variable 5 | | |
| 24 Aperture diaphragm | ∞ | 0.7329 | | |
| 25 | 1.6448 | 0.0749 | 1.51633 | 64.1 |
| 26 | 1.3334 | 0.2939 | | |
| 27 | −1.3578 | 0.0768 | 1.83481 | 42.7 |
| 28 | 41.0177 | 0.0375 | | |
| 29 | −6.7021 | 0.2618 | 1.49700 | 81.5 |
| 30 | −1.4417 | 0.3852 | | |
| 31 | 10.8357 | 0.4033 | 1.49700 | 81.5 |
| 32 | −1.9569 | 0.0150 | | |
| 33 | 2.9050 | 0.3018 | 1.49700 | 81.5 |
| 34 | −12.2721 | 0.8046 | | |
| 35 | ∞ | 3.3000 | 1.51633 | 64.1 |
| 36 | ∞ | 0.0000 | | |

| Zoom ratio | Variable 1 | Variable 2 | Variable 3 | Variable 4 | Variable 5 |
|---|---|---|---|---|---|
| 1.000 (WIDE) | 0.6687 | 1.9972 | 0.5028 | 1.8971 | 0.0749 |
| 1.286 (MIDDLE) | 0.5234 | 1.4166 | 0.4650 | 1.0571 | 1.6785 |
| 1.520 (TELE) | 0.5488 | 1.5476 | 0.1659 | 0.0802 | 2.7983 |

Table 6 shows numerical values corresponding to Conditional expressions 1 to 13 according to Example 5.

As can be seen from Table 5 and FIG. 16, according to the projection zoom lens of Example 5, aberration is effectively corrected in the entire zoom range, and an appropriate back focal length and high telecentricity on the reduction side are obtained. In addition, high performances, such as high bright- In addition, a wide half angle of view of 27.9° is obtained at the wide angle end and the zoom ratio is set to a large value of 1.520. Therefore, the projection zoom lens is suitable for a movie theater with a relatively small projection distance and is capable of widely responding to a variation in the projection distance.

TABLE 6

| Conditional expression No. | Expression | Upper limit | Lower limit | Example 1 | Example 2 | Example 3 | Example 4 | Example 5 |
|---|---|---|---|---|---|---|---|---|
| (1) | Bf/f | 2.5 | — | 3.25 | 2.99 | 3.27 | 2.98 | 2.98 |
| (2), (2A) | f2/f | 3.0, 3.3 | 7.4, 6.5 | 6.07 | 4.80 | 6.27 | 3.62 | 3.51 |
| (3) | $vd_{G5}$ | 70 | — | 81.50 | 81.50 | 81.50 | 81.50 | 70.20 |
| (4) | $vd_{G6p}$ | 60 | — | 81.50 | 81.50 | 81.50 | 62.50 | 81.50 |
| (5) | $vd_{G6n}$ | 40 | — | 42.70 | 42.70 | 42.70 | 47.10 | 42.70 |
| (6) | $Nd_{G6n}$ | 1.8 | — | 183 | 1.83 | 1.83 | 1.81 | 1.83 |
| (7), (7A) | f1/f | −2.2, −2.0 | −1.0, −1.2 | −1.77 | −1.61 | −1.78 | −1.45 | −1.46 |
| (8), (8A) | f3/f | 3.1, 3.4 | 8.6, 7.5 | 5.04 | 3.69 | 4.88 | 7.26 | 6.74 |
| (9), (9A) | f4/f | −7.8, −6.8 | −4.3, −4.8 | −6.56 | −5.81 | −6.10 | −5.06 | −5.21 |
| (10), (10A) | f5/f | 4.1, 4.5 | 7.8, 6.8 | 6.51 | 4.76 | 6.47 | 5.02 | 5.19 |

TABLE 6-continued

| Conditional expression No. | Expression | Upper limit | Lower limit | Example 1 | Example 2 | Example 3 | Example 4 | Example 5 |
|---|---|---|---|---|---|---|---|---|
| (11), (11A) | f6/f | 2.4, 2.7 | 4.1, 3.6 | 3.39 | 2.90 | 3.39 | 2.94 | 2.86 |
| (12), (12A) | $D_{G6}/f$ | 2.0, 2.2 | 3.5, 3.1 | 2.89 | 2.50 | 2.91 | 2.40 | 2.58 |
| (13), (13A) | $|f6/f6_F|$ | 1.8, 2.0 | 4.8, 4.2 | 2.25 | 3.96 | 2.25 | 2.54 | 2.74 |

What is claimed is:

1. A projection zoom lens comprising:
a first lens group having a negative refractive power, the first lens group being fixed and performing focusing when a power of the projection zoom lens varies;
a second lens group having a positive refractive power, the second lens group moving when the power varies;
a third lens group having a positive refractive power, the third lens group moving when the power varies;
a fourth lens group having a negative refractive power, the fourth lens group moving when the power varies;
a fifth lens group having a positive refractive power, the fifth lens group moving when the power varies; and
a sixth lens group having a positive refractive power, the sixth lens group being fixed when the power varies, and the sixth lens group including a stop arranged closest to a magnification side,
wherein the first to sixth lens groups are arranged in this order from the magnification side,
a numerical aperture is constant in an entire power variation range,
all lenses are single lenses,
a reduction side is telecentric, and
the projection zoom lens satisfies the following conditional expression:

$$2.5 < Bf/f$$

where Bf is an air-converted back focal length of the entire system, and
f is a focal length of the entire system at a wide angle end.

2. The projection zoom lens according to claim 1,
wherein the second lens group includes a positive meniscus lens that is arranged closest to the magnification side and has a concave surface facing the magnification side.

3. The projection zoom lens according to claim 1,
wherein an aperture is provided in the second lens group.

4. The projection zoom lens according to claim 1,
wherein the projection zoom lens satisfies the following conditional expression:

$$3.0 < f2/f < 7.4$$

where f2 is a focal length of the second lens group.

5. The projection zoom lens according to claim 1,
wherein the fifth lens group includes one biconvex lens, and
the fifth lens group satisfies the following conditional expression:

$$70 < vd_{G5}$$

where $vd_{G5}$ is an Abbe number of the biconvex lens in the fifth lens group with respect to the d-line.

6. The projection zoom lens according to claim 1,
wherein the sixth lens group includes a negative meniscus lens having a convex surface facing the magnification side, a negative lens having a concave surface facing the magnification side, a positive lens having a convex surface facing the reduction side, and at least one positive lens which are arranged in this order from the magnification side, and the sixth lens group satisfies the following conditional expression:

$$60 < vd_{G6p}$$

where $vd_{G6p}$ is an Abbe number of each positive lens in the sixth lens group with respect to the d-line.

7. The projection zoom lens according to claim 6,
wherein the sixth lens group satisfies the following conditional expressions:

$$40 < vd_{G6n};\ \text{and}$$

$$1.8 < Nd_{G6n}$$

where $vd_{G6n}$ is an Abbe number of the negative lens having the concave surface facing the magnification side in the sixth lens group with respect to the d-line, and $Nd_{G6n}$ is a refractive index of the negative lens having the concave surface facing the magnification side in the sixth lens group with respect to the d-line.

8. The projection zoom lens according to claim 1,
wherein the projection zoom lens satisfies the following conditional expression:

$$-2.2 < f1/f < -1.0$$

where f1 is a focal length of the first lens group.

9. The projection zoom lens according to claim 1,
wherein the projection zoom lens satisfies the following conditional expression:

$$3.1 < f3/f < 8.6$$

where f3 is a focal length of the third lens group.

10. The projection zoom lens according to claim 1,
wherein the projection zoom lens satisfies the following conditional expression:

$$-7.8 < f4/f < -4.3$$

where f4 is a focal length of the fourth lens group.

11. The projection zoom lens according to claim 1,
wherein the projection zoom lens satisfies the following conditional expression:

$$4.1 < f5/f < 7.8$$

where f5 is a focal length of the fifth lens group.

12. The projection zoom lens according to claim 1,
wherein the projection zoom lens satisfies the following conditional expression:

$$2.4 < f6/f < 4.1$$

where f6 is a focal length of the sixth lens group.

13. The projection zoom lens according to claim 1,
wherein the projection zoom lens satisfies the following conditional expression:

$$2.0 < D_{G6}/f < 3.5$$

where $D_{G6}$ is a distance from the stop in the sixth lens group to a lens surface closest to the reduction side in the sixth lens group.

14. The projection zoom lens according to claim 1,
wherein the projection zoom lens satisfies the following conditional expression:

$$1.8 < |f6/f6_F| < 4.8$$

where $f6_F$ is a distance from a lens surface closest to the magnification side in the sixth lens group to the focus of the sixth lens group on the magnification side and f6 indicates the focal length of the sixth lens group.

15. A projection display device comprising:
a light source;
a light valve; and
the projection zoom lens according to claim 1 that projects an optical image formed by light which is modulated by the light valve onto a screen.

* * * * *